United States Patent
Fischer et al.

(10) Patent No.: US 6,810,570 B2
(45) Date of Patent: Nov. 2, 2004

(54) METHOD OF ATTACHING A CONNECTOR ELEMENT TO A DUCT FLANGE

(75) Inventors: Joshua D. Fischer, Imperial, MO (US); Dale R. Foster, Barnhart, MO (US); Herbert J. Fischer, Imperial, MO (US)

(73) Assignee: Engel Industries, Inc., St. Louis, MI (US)

( * ) Notice: Subject to any disclaimer, the term of this patent is extended or adjusted under 35 U.S.C. 154(b) by 24 days.

(21) Appl. No.: 10/190,726

(22) Filed: Jul. 8, 2002

(65) Prior Publication Data

US 2002/0170613 A1 Nov. 21, 2002

Related U.S. Application Data

(62) Division of application No. 09/495,200, filed on Jan. 31, 2000, now Pat. No. 6,460,573.

(51) Int. Cl.[7] .................................................. B23P 11/00
(52) U.S. Cl. ............................ 29/417; 29/505; 29/509; 29/513; 29/521; 285/405; 285/424
(58) Field of Search ................................. 29/896.6, 412, 29/417, 505, 509, 513, 521, 798, 243.5, 283.5, 432.1, 564.6, 237; 285/364, 368, 405, 406, 412, 424; 138/109, 155, DIG. 4

(56) References Cited

U.S. PATENT DOCUMENTS

| | | | | |
|---|---|---|---|---|
| 1,639,593 A | * | 8/1927 | Dean ......................... | 172/733 |
| 2,895,214 A | | 7/1959 | Erdmann ..................... | 29/229 |
| 2,900,107 A | | 8/1959 | Erdmann .................... | 221/220 |

(List continued on next page.)

FOREIGN PATENT DOCUMENTS

| | | | | |
|---|---|---|---|---|
| FR | 2620638 A1 | * | 3/1989 | ............... 29/505 |
| JP | 06238368 A | * | 8/1994 | ............... 29/505 |

OTHER PUBLICATIONS

"HVAC Duct Construction Standards Metal and Flexible"; Sheet Metal and Air Conditioning Contractors' National Association, Inc., 4201 Lafayette Center Drive, Chantilly, VA 20151–1209, Second Edition, 1995 with Addendum No. 1 Nov. 1997 (pp. 1.80 & 1.81).

"DW/142 Specification For Sheet Metal Ductwork"; Heating and Ventilating Contractors' Association, 1982 (p. 31).

"HVAC Duct Construction Standards Metal and Flexible"; Sheet Metal and Air Conditioning Contractors' National Association, Inc., Second Edition, 1995 (pp. 7.2, 7.3, 7.6 & 7.7).

"Ideas that Work for you Every Day"; reprinted from SMACNA Higher Pressure Manual (No Date).

Primary Examiner—David P. Bryant
Assistant Examiner—Jermie E. Cozart
(74) Attorney, Agent, or Firm—Blackwell Sanders Peper Martin LLP

(57) ABSTRACT

A duct assembly for transporting pressurized fluid therethrough. The assembly includes first and second duct sections. Each of the duct sections has sides extending between opposite ends. Each of the sides join an adjacent side and has a flange extending laterally outward from each end. The first and second sections are positioned in end-to-end relation so that the flanges extending outward from one of the ends of the first section face the flanges extending outward from one of the ends of the second section to define flange pairs. The assembly also includes a plurality of connector pairs. Each of the connector pairs are positioned at one of the ends of the duct sections. Each of the connector pairs includes a first connector spanning adjacent flanges of the first duct section and a second connector spanning adjacent flanges of the second duct section. The first and second connectors are positioned on opposite faces of an adjacent flange pair so the flange pair is positioned between the first and second connectors. Further, the assembly includes fasteners extending through one of the connector pairs and one of the flange pairs to connect the flange pairs. In addition, methods and apparatus for use in making the duct assemblies are disclosed.

15 Claims, 19 Drawing Sheets

U.S. PATENT DOCUMENTS

| | | | |
|---|---|---|---|
| 2,906,433 A | | 9/1959 | Erdmann .................... 221/220 |
| 2,973,108 A | | 2/1961 | Gable ............................ 214/8 |
| 3,023,493 A | | 3/1962 | Mittermaier ................. 29/203 |
| 3,687,168 A | | 8/1972 | Sherman et al. ............ 138/109 |
| 3,705,452 A | * | 12/1972 | Motta ....................... 29/155 R |
| 3,837,069 A | * | 9/1974 | Nordgren .................. 29/432.1 |
| 3,923,326 A | * | 12/1975 | Mez ........................... 285/363 |
| 4,024,784 A | | 5/1977 | Mueller ....................... 83/488 |
| 4,038,128 A | | 7/1977 | Mueller ...................... 156/355 |
| 4,047,282 A | * | 9/1977 | Jureit et al. .................. 29/432 |
| 4,185,487 A | | 1/1980 | Merideth ...................... 72/315 |
| 4,261,098 A | | 4/1981 | Lincoln ....................... 29/809 |
| 4,332,203 A | | 6/1982 | Flowers ...................... 105/422 |
| 4,410,206 A | | 10/1983 | Mez ........................... 285/405 |
| 4,466,641 A | | 8/1984 | Heilman et al. ............ 285/406 |
| 4,507,836 A | | 4/1985 | Hiromitsu .................... 29/252 |
| 4,509,778 A | * | 4/1985 | Arnoldt ...................... 285/406 |
| 4,564,227 A | | 1/1986 | Murck ........................ 285/364 |
| 4,572,553 A | | 2/1986 | Geldner ...................... 285/363 |
| 4,579,375 A | | 4/1986 | Fischer et al. ............. 285/363 |
| 4,713,959 A | | 12/1987 | Bennett ........................ 72/410 |
| 4,870,749 A | | 10/1989 | Roy et al. .................... 29/798 |
| 4,989,438 A | | 2/1991 | Simon ......................... 72/325 |
| 5,069,484 A | * | 12/1991 | McElroy ....................... 285/39 |
| 5,090,101 A | | 2/1992 | Welty ........................ 29/243.5 |
| 5,283,944 A | | 2/1994 | Goodhue ..................... 29/701 |
| 5,321,880 A | | 6/1994 | Goodhue ..................... 29/701 |
| 5,342,100 A | | 8/1994 | Goodhue .................... 285/363 |
| 5,353,616 A | | 10/1994 | Fischer et al. ................. 72/51 |
| 5,358,013 A | | 10/1994 | McClain .................... 138/109 |
| 5,448,815 A | | 9/1995 | Kolesar ....................... 29/243 |
| 5,495,652 A | | 3/1996 | Kitamura et al. .......... 29/243.5 |
| 5,564,758 A | * | 10/1996 | Tiberio ....................... 285/405 |
| 5,603,153 A | * | 2/1997 | Zmyslowski ................. 29/509 |
| 5,617,619 A | * | 4/1997 | Knudson ..................... 29/21.1 |
| 5,621,956 A | | 4/1997 | Kolesar ...................... 29/243.5 |
| 5,649,347 A | | 7/1997 | Cattadoris ................... 29/252 |
| 5,653,482 A | * | 8/1997 | Ficchi, Jr. ................... 285/405 |
| 5,673,947 A | | 10/1997 | De Waal ..................... 285/364 |
| 5,720,144 A | * | 2/1998 | Knudson et al. ........... 52/731.9 |
| 5,862,579 A | * | 1/1999 | Blumberg .................... 29/417 |
| 5,890,276 A | * | 4/1999 | Lorincz .................... 29/564.6 |
| 5,926,937 A | | 7/1999 | Goodhue ..................... 29/509 |
| 6,047,466 A | | 4/2000 | Karpman et al. ............. 29/809 |
| 6,081,985 A | | 7/2000 | Fischer et al. ............... 29/509 |

* cited by examiner

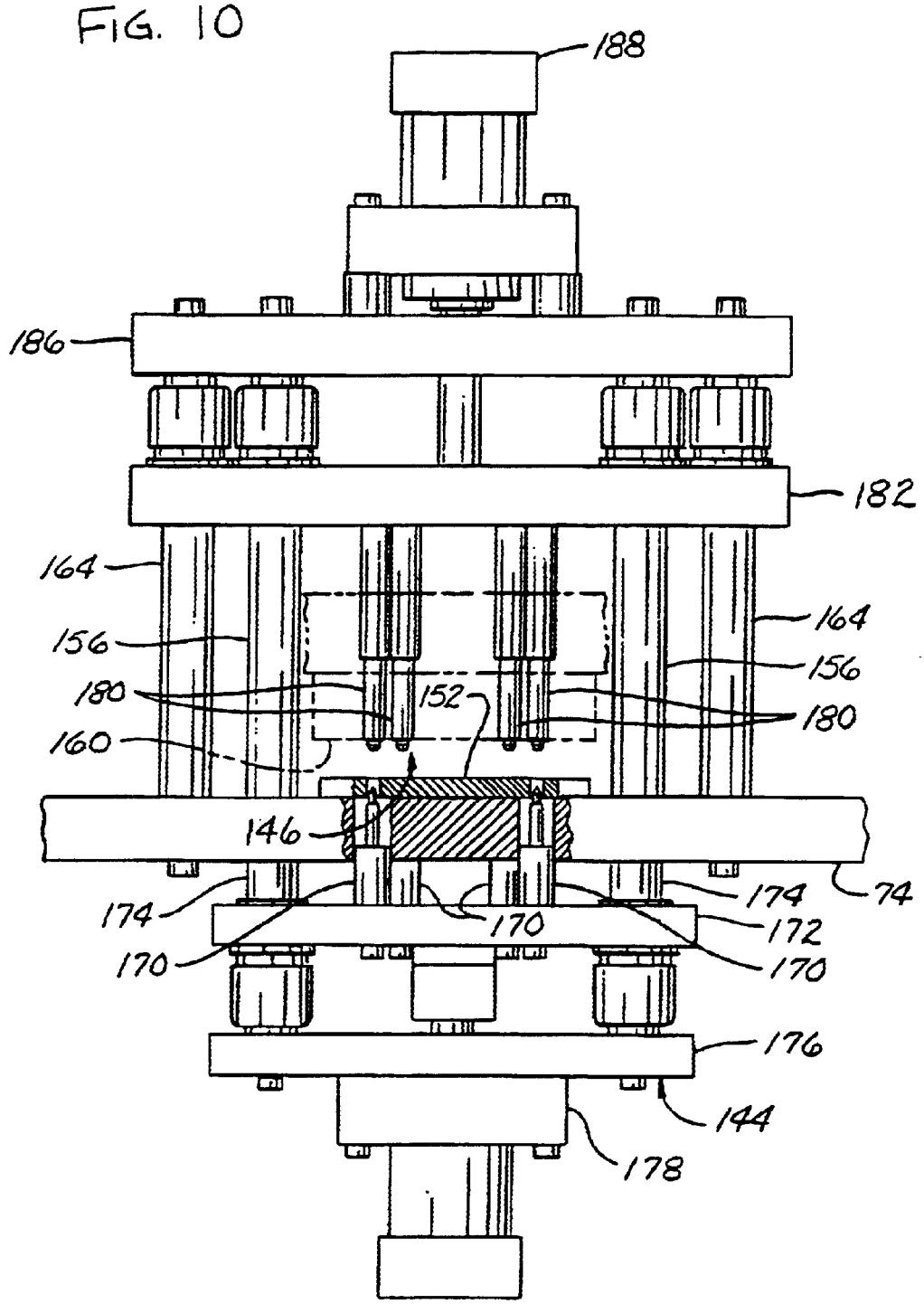

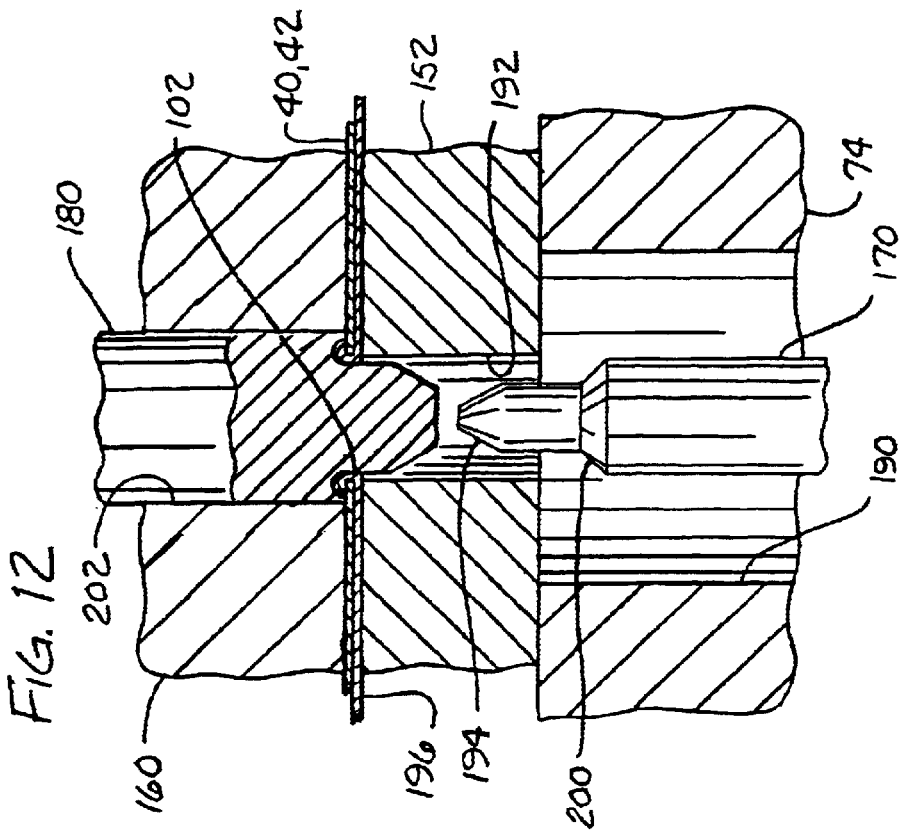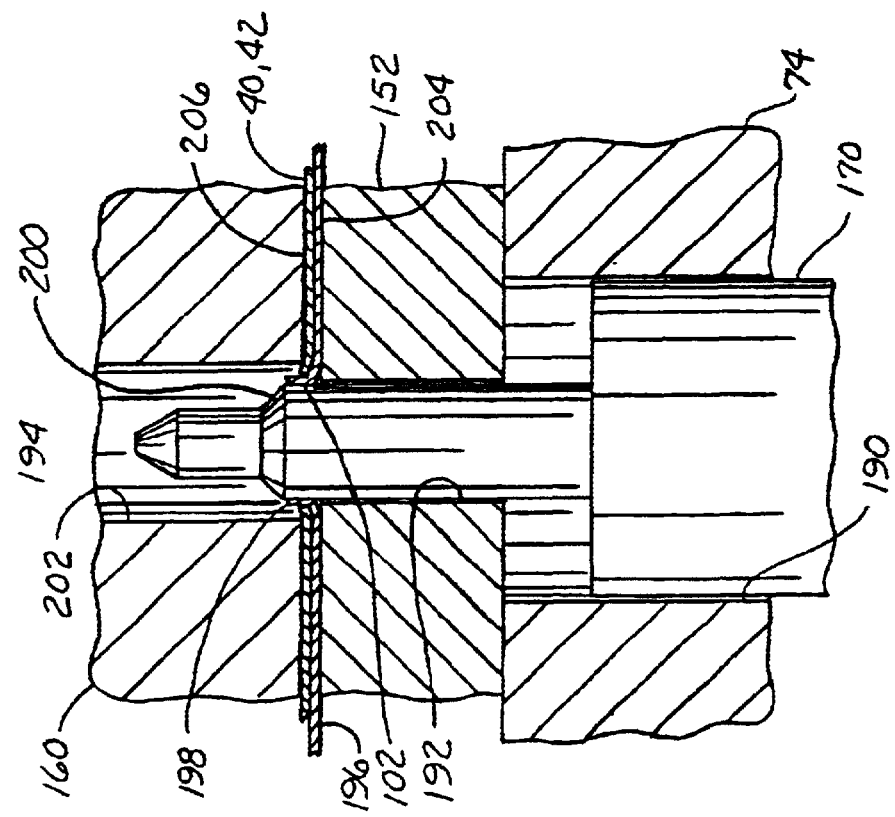

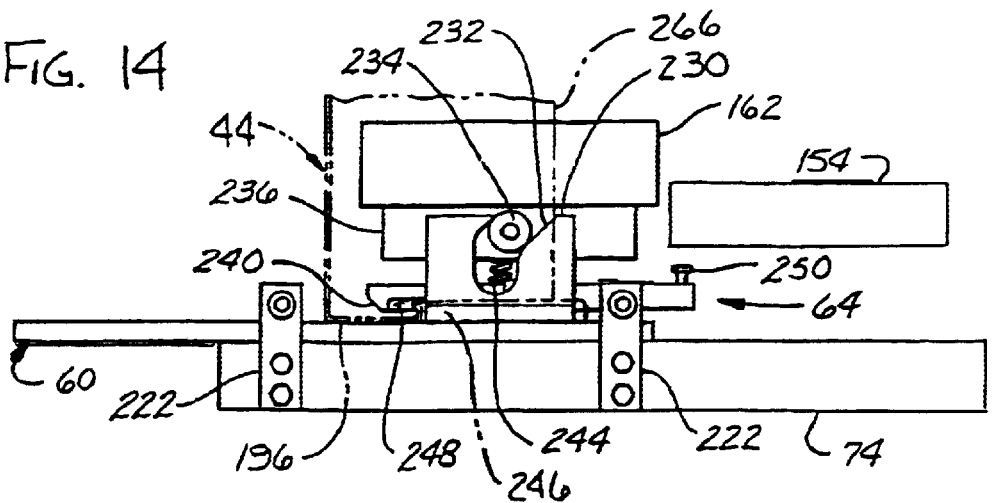
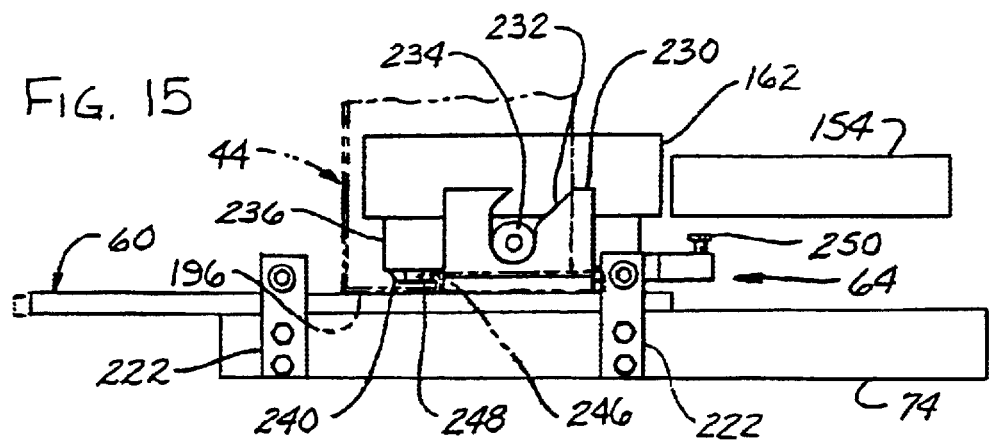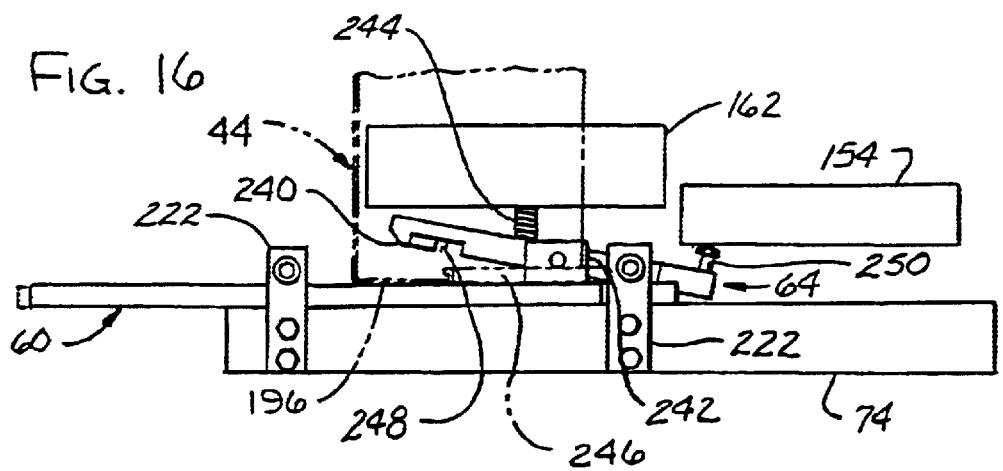

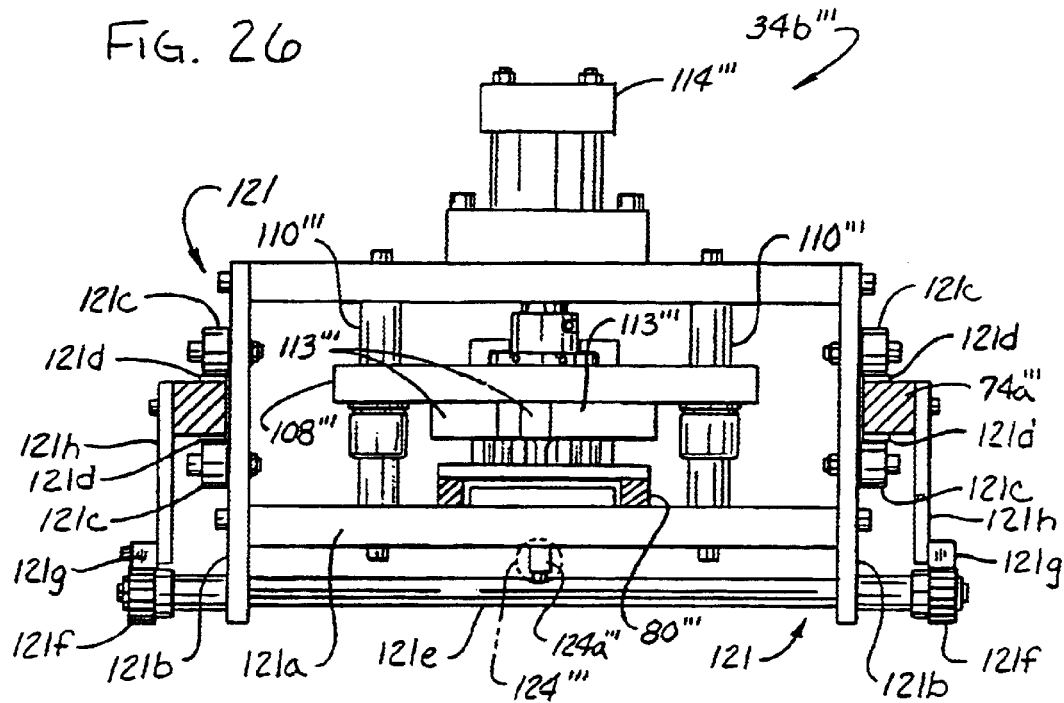
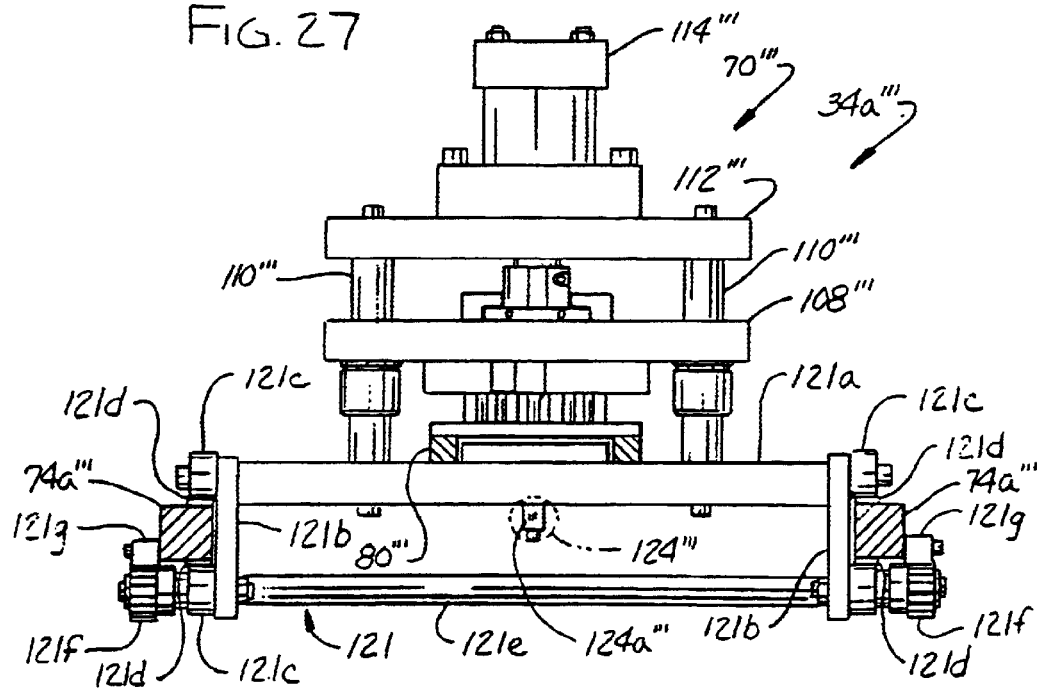

METHOD OF ATTACHING A CONNECTOR ELEMENT TO A DUCT FLANGE

CROSS REFERENCE TO RELATED APPLICATION

This application is a division of application Ser. No. 09/495,200 filed Jan. 31, 2000, now U.S. Pat. No. 6,460,573.

BACKGROUND OF THE INVENTION

The present invention relates generally to duct assemblies for transporting pressurized fluid such as heating and cooling air, and more particularly to an apparatus and method for use in making a duct assembly having permanently attached flange connectors.

Duct assemblies used to transport pressurized fluid in buildings (e.g., for forced air HVAC systems) are conventionally formed in sections and secured together to form longer spans as needed. A duct section is typically formed of sheet metal into a rectangular shape having four sides and bent or seamed corners at the intersections of the sides. A flange extends essentially perpendicularly outward from each side at both ends of the duct section. The sections are positioned end-to-end so the flanges of one section align with the flanges of the adjacent section and the aligned flanges are fastened together to form the duct assemblies. The flanges which are formed as part of each duct section are not continuous. Rather, there are gaps at each place on the duct sections where adjacent flanges meet for manufacturing convenience. Stamped corner pieces are inserted in channels formed in each flange so they span the gap at each place on the duct section where adjacent flanges meet. When the duct sections are positioned end-to-end, the stamped corner pieces of one duct section are aligned with stamped corner pieces of the adjacent duct section. Fasteners are inserted through holes extending through the stamped corner pieces to clamp the duct sections together. Frequently, gaskets are placed between aligned flanges to achieve an airtight seal and clips are used to hold the aligned flanges together between the stamped corner pieces.

Stamped corner pieces are sometimes inserted in the duct section at one location and transported to another location for attachment to other duct sections to form duct assemblies. The corner pieces are snapped into the flanges, which are formed with return bends at their free ends to bear against the corner piece with a spring force to hold the corner pieces in the flange. It is also known to press in the corner pieces and crimp over the return bends of the flanges to secure them. However in many cases, the snap connection of the corner piece into the flange is not completely secure, even when crimping is used. Not only does this allow the corner pieces to become separated from the flanges more easily, but it also allows adjacent flanges of the duct assembly to move independently of each other. When the corner pieces become separated from the flanges, additional time is required to reinsert the corner pieces in the flanges. Moreover, if the corner pieces become separated when the duct sections are overhead, the corner pieces can fall on workers below. Still further, if the corner pieces move independently from the flanges, adjacent flanges of the duct assembly can move independently from each other permitting the duct sections to move with respect to each other thereby allowing fluid to leak from between the joints. Finally, the insertion of the corner pieces into the flanges provides no rigid interconnection of adjacent flanges and therefore minimal angular rigidity to the joint between the duct sections or to the duct assembly in general.

SUMMARY OF THE INVENTION

Among the several objects and features of the present invention may be noted the provision of a duct assembly which has improved strength at its joints; the provision of such a duct assembly which maintains a tight seal at the joint; the provision of such a duct assembly which has fewer parts constituting the joint; the provision of a method and apparatus for quickly and inexpensively attaching connection elements to flanges of duct sections to facilitate interconnection of duct sections; and the provision of a method and apparatus for quickly and inexpensively preparing duct sections for interconnection.

Briefly, the present invention includes apparatus for making a patterned strip for use in connecting sections of duct. The patterned strip has opposite lateral sides extending parallel to a longitudinal centerline of the strip and evenly spaced slots extending inward from each of the opposite lateral sides of the strip toward the longitudinal centerline. Each of the slots is obliquely aligned with respect to the lateral sides of the strip. The apparatus comprises a guide for guiding the strip in a longitudinal direction and a slotting tool arranged relative to the guide for making a laterally spaced pair of slots in the strip. In addition, the apparatus includes an indexing device arranged relative to the guide for indexing the strip a predetermined longitudinal distance before making subsequent laterally spaced pairs of slots in the strip to make the evenly spaced slots in the strip.

In another aspect, the present invention includes apparatus for attaching a leading edge portion of a patterned strip to a flange of a section of duct for facilitating connection of sections of duct in end-to-end relation. The apparatus comprises a fixture for locating a section of duct and a guide adapted to receive the patterned strip. The guide is arranged relative to the fixture to guide the patterned strip toward the fixture. In addition, the apparatus includes a fastening tool arranged relative to the fixture for affixing the duct flange and a leading edge portion of the patterned strip to each other and a shear arranged relative to the fixture for shearing the leading edge portion of the patterned strip from the patterned strip.

Further, a method of the present invention for attaching an element of a patterned strip to a flange of a section of duct includes the step of piercing a portion of the duct flange through a hole in the connector element. An area of the duct flange adjacent the hole is upset in a direction parallel to the pierced portion of the duct flange. Then the portion of the duct flange pierced through the hole against the element is flared to fasten the duct flange and the element to each other. The method also includes the step of at least partially flattening the upset area of the duct flange to tighten the connection between the duct flange and the element.

In addition, the present invention includes a method for attaching a leading edge portion of a patterned strip to a flange of a section of duct for facilitating connection of sections of duct in end-to-end relation. The method includes the steps of guiding a patterned strip toward a location where the strip is to be attached to the flange at an end of the section of duct and attaching the leading edge portion to the duct flange. Finally, the method includes the step of separating the leading edge portion from the strip.

Moreover, the present invention includes a patterned strip for use in connecting sections of duct in end-to-end relation. The strip includes an elongate sheet having opposite lateral sides extending between opposite ends spaced along a longitudinal centerline of the sheet. The sheet has evenly spaced slots extending inward from each of the opposite lateral sides of the sheet toward the longitudinal centerline. Each of the slots extends at an angle with respect to the side of the sheet from which it extends. Further, each of the slots is laterally spaced from another of the slots extending inward from the opposite side of the sheet. Each of the slots and the corresponding slot laterally spaced therefrom are oriented at an angle with respect to each other.

Still further, the present invention includes a method for attaching connector elements to flanges at ends of duct sections to facilitate connection of the duct sections in end-to-end relation. The method includes placing an element in contact with a duct section flange of the duct section. The element is permanently affixed to the duct section flange by moving fastening means from at least one of the element and the flange through another of the element and the flange to make an integral connection of the element to the duct section flange.

In yet another aspect of the present invention, a duct section has sides extending between opposite ends. Each of the sides joins an adjacent side and has a flange extending laterally outward from each end. Each of the flanges includes a hole extending therethrough. Each of the holes is spaced from where the sides of the duct section are joined by a distance of between about one half inch and about five inches.

In addition, this invention is a duct assembly for transporting pressurized fluid therethrough. The assembly includes first and second duct sections. Each of the duct sections has sides extending between opposite ends. Each of the sides joins an adjacent side and has a flange extending laterally outward from each end. The first and second sections are positioned in end-to-end relation so the flanges extending outward from one of the ends of the first section face the flanges extending outward from one of the ends of the second section thereby defining aligned flange pairs and so sides of the first duct section are generally aligned with the sides of the second duct section. The duct assembly also includes a plurality of connector pairs. Each connector pair is positioned at one place on the first and second duct sections where the sides join. Each of the connector pairs comprises a first connector spanning adjacent flanges of the first duct section and a second connector spanning adjacent flanges of the second duct section. The first and second flange connectors are positioned on opposite faces of an adjacent flange pair so the flange pair is positioned between the first and second connectors. In addition, the duct assembly includes fasteners. Each of the fasteners extends through one of the connector pairs and one of the flange pairs to connect the flange pairs.

In another aspect, the duct assembly of the present invention includes a duct section having sides extending between opposite ends. Each of the sides joins an adjacent side and has a flange extending laterally outward from each end. The assembly also includes connectors. Each of the connectors is fixedly connected to adjacent flanges at the end of the duct section to prevent movement between the adjacent flanges of the duct section.

Finally, a method of the present invention for assembling a duct assembly includes the steps of positioning first and second sections in end-to-end relation so the flanges extending outward from one of the ends of the first section face the flanges extending outward from one of the ends of the second section thereby defining aligned flange pairs and so sides of the first duct section are aligned with the sides of the second duct section. In addition, the method includes positioning a connector pair comprising first and second connectors, the first connector spanning adjacent flanges of the first duct section and the second connector spanning adjacent flanges of the second duct section and so the first and second connectors are positioned on opposite faces of an adjacent flange pair so the flange pair is positioned between the first and second connectors. The connector pair and one of the flange pairs are securely fastened together to connect the flange pair.

Other objects and features of the present invention will be in part apparent and in part pointed out hereinafter.

BRIEF DESCRIPTION OF THE DRAWINGS

FIG. 10 is a cross section of the apparatus similar to FIG. 9 but having a fixture removed;

FIG. 11 is a schematic detail of FIG. 10 showing a piercing tool;

FIG. 12 is a schematic detail of FIG. 10 showing a flaring tool;

FIG. 14 is a schematic detail from the vantage indicated by line 14—14 of FIG. 13 showing a gripping mechanism prior to gripping a duct section;

FIG. 15 is the schematic detail of FIG. 14 showing the gripping mechanism during gripping the duct section;

FIG. 16 is the schematic detail of FIG. 14 showing the gripping mechanism after gripping the duct section;

FIG. 26 is a cross section of the apparatus of FIG. 25 taken in the plane of line 26—26 and illustrating an upper strip patterning and indexing apparatus; and FIG. 27 is a cross section of the apparatus of FIG. 25 taken in the plane of line 27—27 and illustrating a lower strip patterning and indexing apparatus.

Corresponding reference characters indicate corresponding parts throughout the several views of the drawings.

DETAILED DESCRIPTION OF THE PREFERRED EMBODIMENT

Figure 1:
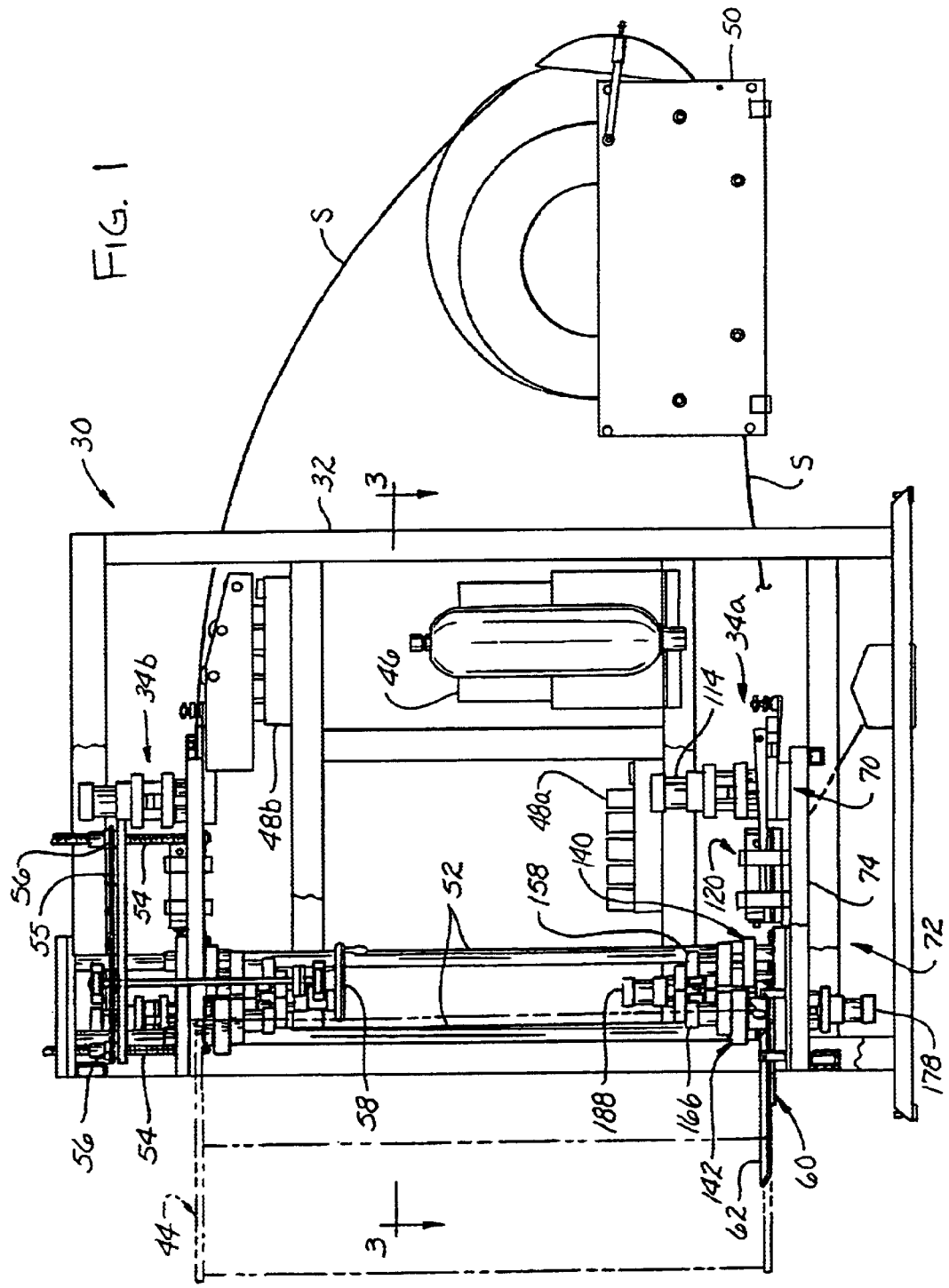
FIG. 1 is a side elevation of an apparatus of the present invention for preparing duct sections for assembly.

Referring now to the drawings and in particular to FIG. 1, apparatus for making a patterned strip and for attaching leading edge portions of the patterned strip to flanges on sections of duct is designated in its entirety by the reference numeral 30. The apparatus 30 includes a frame 32 supporting a stationary lower mechanism, generally designated 34a, and a moveable upper mechanism, generally designated 34b. Parts of the frame 32 have been broken away in FIG. 1 to fully reveal the mechanisms 34a, 34b. Each of the mechanisms 34a, 34b makes a patterned strip, generally designated by 40, of elements 42 (FIG. 17) from strips of steel S and attaches the patterned strip at one of the elements to flanges of sections of duct, generally designated by 44. The strip 40 is separated from the element 42 attached to the flanges of the duct section 44 by the apparatus. A conventional hydraulic supply 46 is mounted on the frame 32 for supplying the upper and lower mechanisms 34b, 34a with pressurized hydraulic fluid through hydraulic lines (not shown for clarity of illustration). Conventional controls 48a, 48b regulate flow of fluid delivered to the mechanisms 34a, 34b, respectively. It is noted that the hydraulic controls are shown at 48a, 48b but that a conventional PLC programmed to operate the hydraulic controls is not shown. A conventional double coil holder 50 mounted adjacent the frame 32 supplies strips of steel to the mechanisms 34a, 34b. As the frame 32, the hydraulic supply 46, the controls 48a, 48b, and the coil holder 50 are conventional, they will not be described in further detail.

Figure 2:
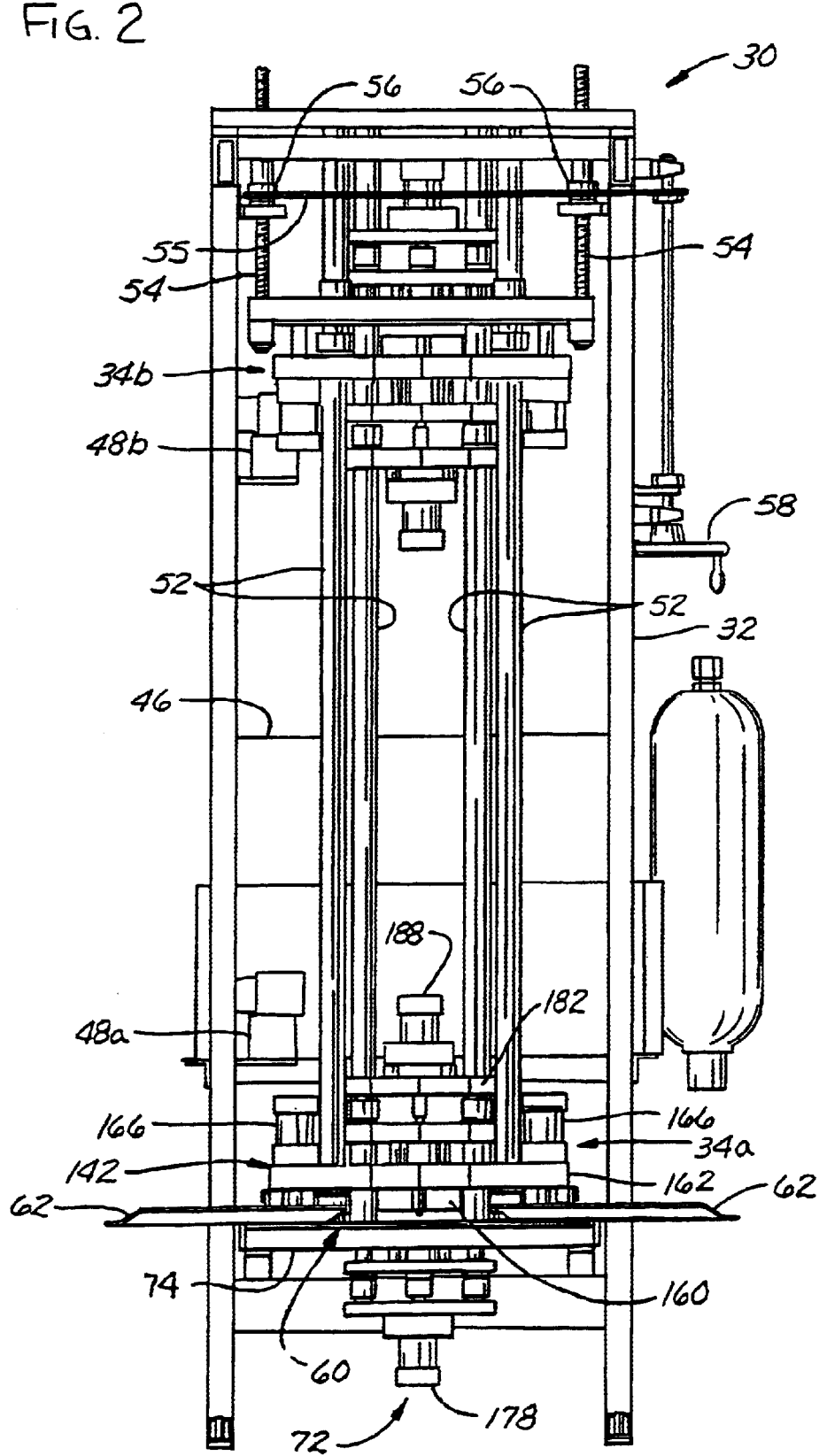
FIG. 2 is a front elevation of the apparatus of FIG. 1.

As illustrated in FIGS. 1 and 2, the upper mechanism 34b is slidably mounted on four vertical posts 52 extending upward from the lower assembly 34a to accommodate duct sections 44 having differing lengths. Screw shafts 54 are provided between the frame 32 and the upper mechanism 34b for moving the mechanism up and down along the posts 52. The shafts 54 are turned by a chain 55 engaging sprockets 56 mounted on the shafts. A crank 58 rotatably mounted on the frame 32 drives the chain 55 for raising and lower the upper mechanism 34b.

Figure 3:
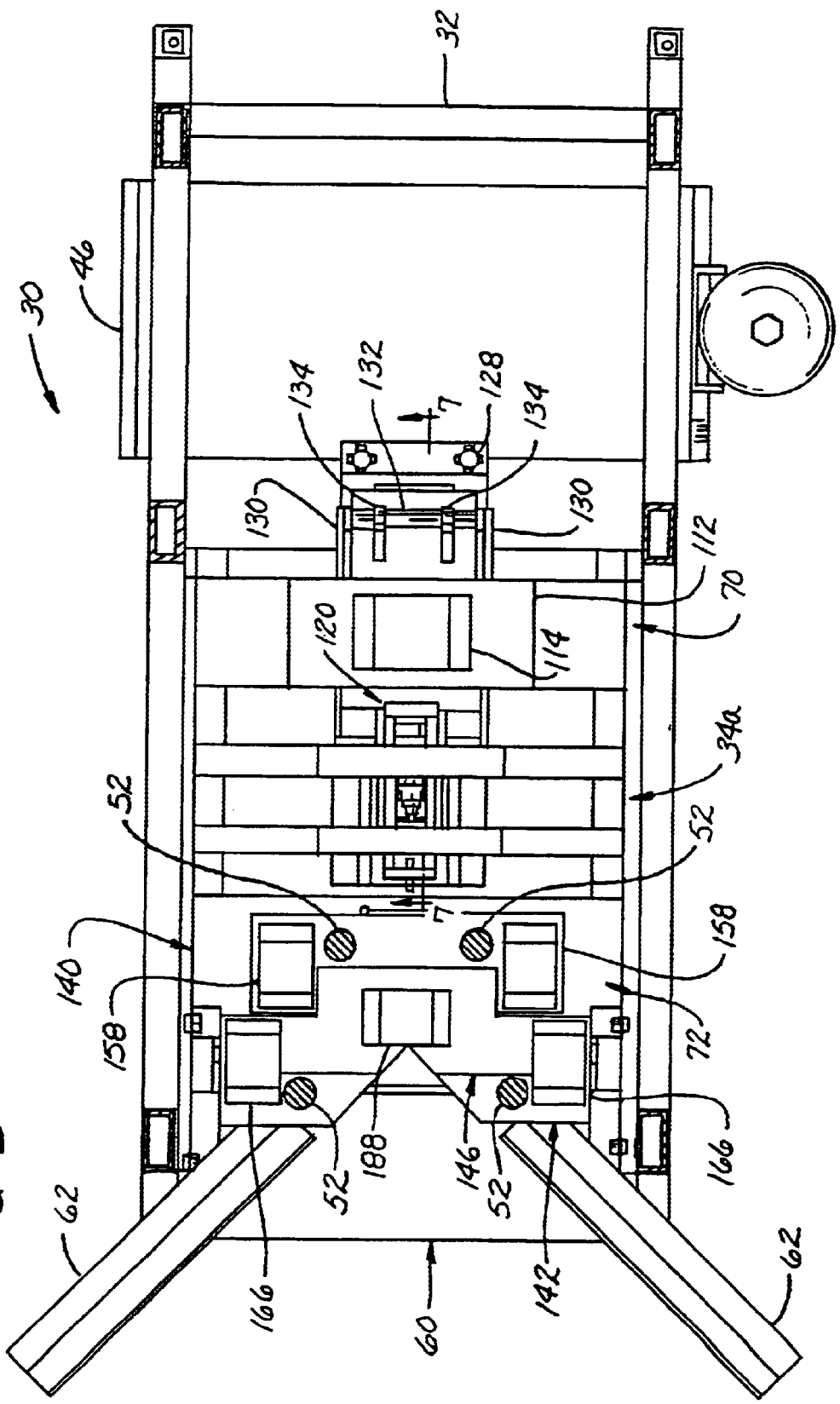
FIG. 3 is a cross section of the apparatus taken in the plane of line 3—3 of FIG. 1.

FIG. 3 illustrates a lower portion of the apparatus 30 including the lower mechanism 34a. The upper mechanism 34b is identical to the lower mechanism 34a except the lower mechanism includes a support, generally designated by 60, for supporting the duct section 44 as the mechanisms attach the patterned strip 40 (FIG. 17) to the flanges of the duct section. The duct section 44 is turned on end and placed into the apparatus 30 so that a pair of adjacent flanges at the lower end of the duct section is received by the lower mechanism 34a and a opposite pair of adjacent flanges at the upper end of the duct section is received in the upper mechanism 34b. The lower end of the duct section 44 rests on and is supported by the support 60 during the operations of fastening the patterned strip 40 to adjacent flanges 196 of the duct section and shearing the attached leading element 42 of the strip from the remainder of the strip. The support 60 includes guides 62 for aligning the duct section 44 on the support and for guiding a strip 40 of connector elements 42 toward a location where they will be attached to the duct flange. The support 60 also includes a gripping mechanism, generally designated by 64 (FIG. 13), for holding the duct section 44 against the guides 62 to ensure proper alignment of the elements 42 and the duct section 44 as they are attached as will be explained in greater detail below. Since the upper and lower mechanisms 34b, 34a are substantially identical in all other respects, only the lower mechanism will be described in further detail.

Figure 4:
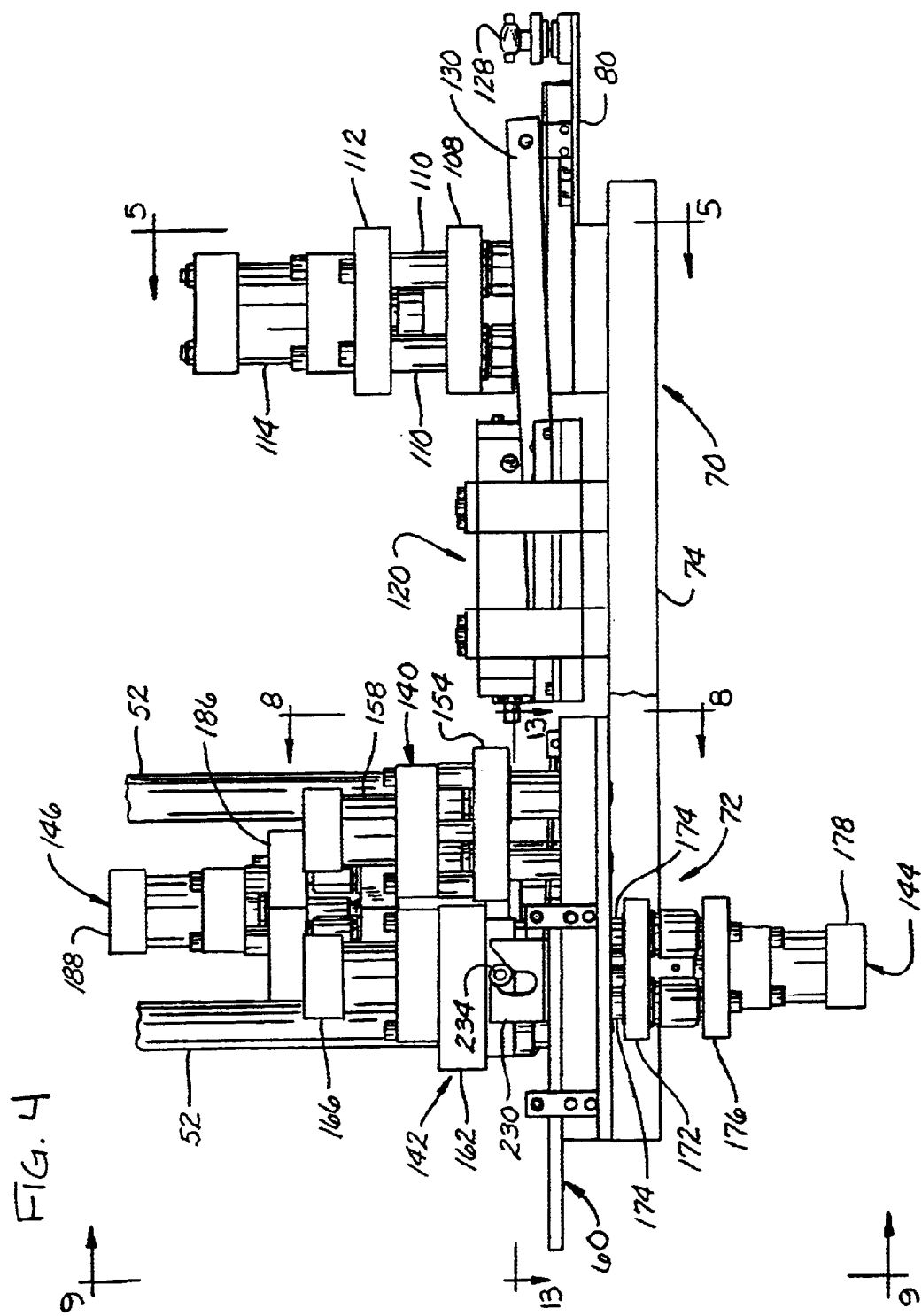
FIG. 4 is an enlarged detail of the apparatus of FIG. 1.

As illustrated in FIG. 4, the lower mechanism 34a generally comprises a strip patterning apparatus (generally designated by 70) for making a patterned strip 40 of elements 42 (FIG. 17) from the steel strip S, and a fastening apparatus (generally designated by 72) for attaching the patterned strip 40 (particularly at a leading edge portion defined by one of the elements 42) to a flange 196 of a section of duct 44 and separating the attached element from the strip. In the preferred embodiment, the strip 40 is fastened to flanges 196 (FIG. 18) formed as one piece with the duct section 44 at each end of the duct section. However, it is envisioned that the flanges 196 may be separately made and attached to the duct section 44, or that the strip 40 could be attached to the duct section in ways equivalent to attachment to the flanges. The guides 62 have been removed from FIG. 4 for clarity of illustration. It is noted that the fastening apparatus 72 of the lower mechanism 34a is inverted relative to the position occupied by the corresponding fastening apparatus of the upper mechanism 34b. The construction is otherwise the same, but the inverted orientations accommodate the need to move the strip 40 upward into engagement with the flange in the upper mechanism 34b and downward into engagement with the flange in the lower mechanism 34a.

Figure 5:
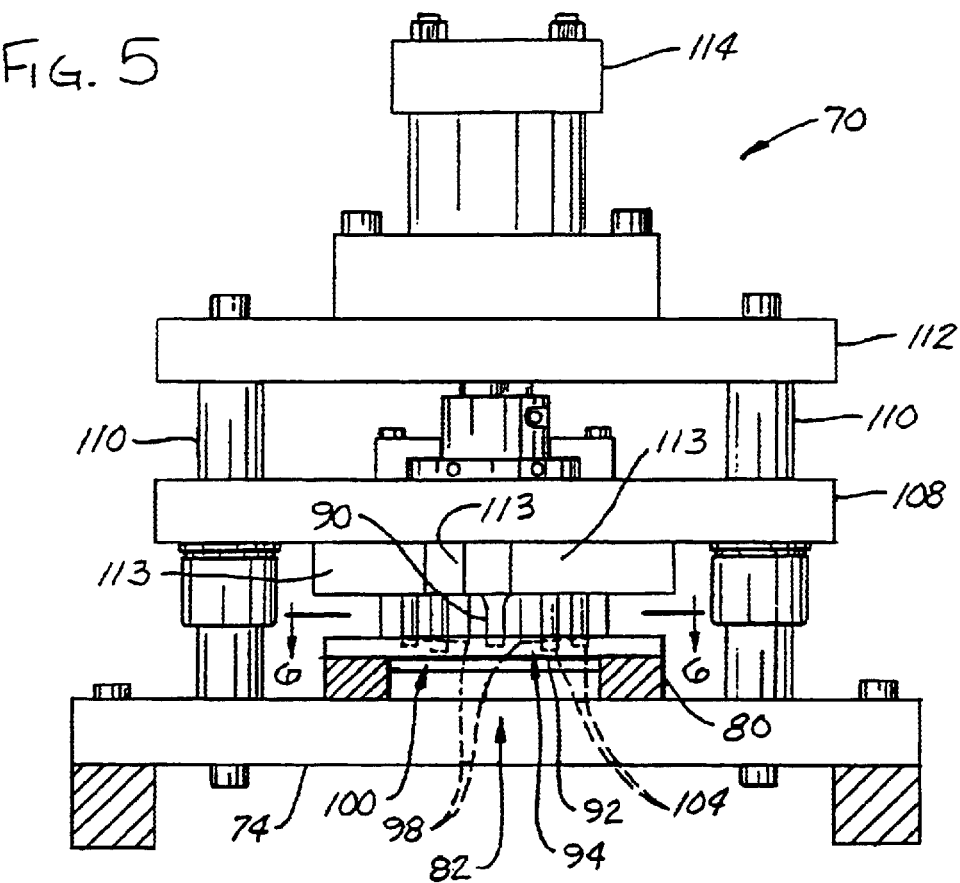
FIG. 5 is a section of the apparatus taken in the plane of line 5—5 of FIG. 4.
Figure 6:
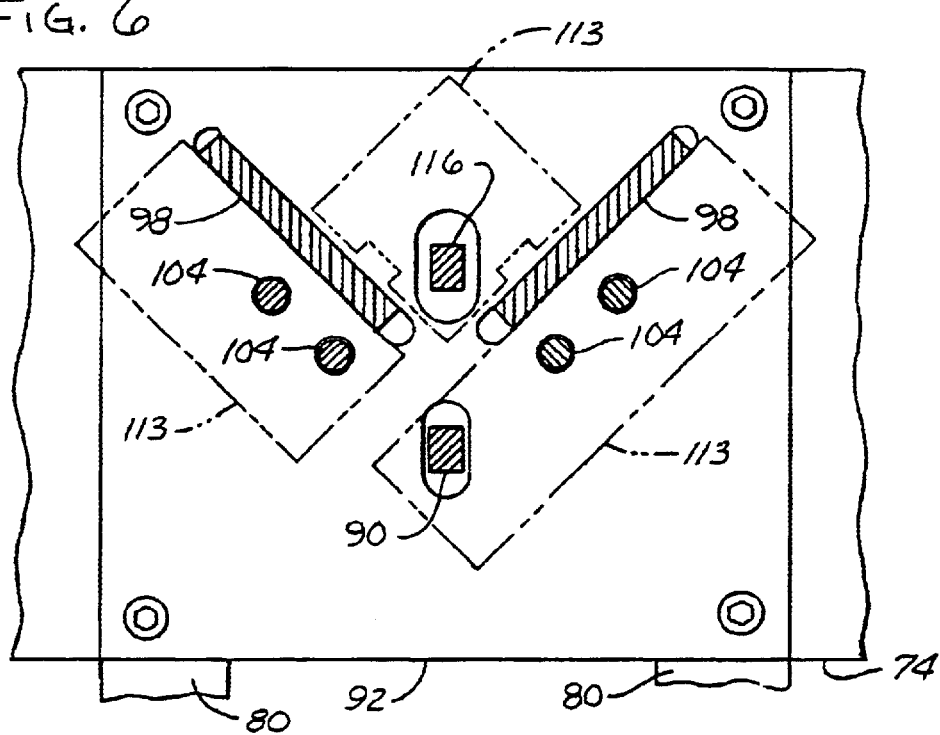
FIG. 6 is a fragmentary section of the apparatus taken in the plane of line 6—6 of FIG. 5.
Figure 17:
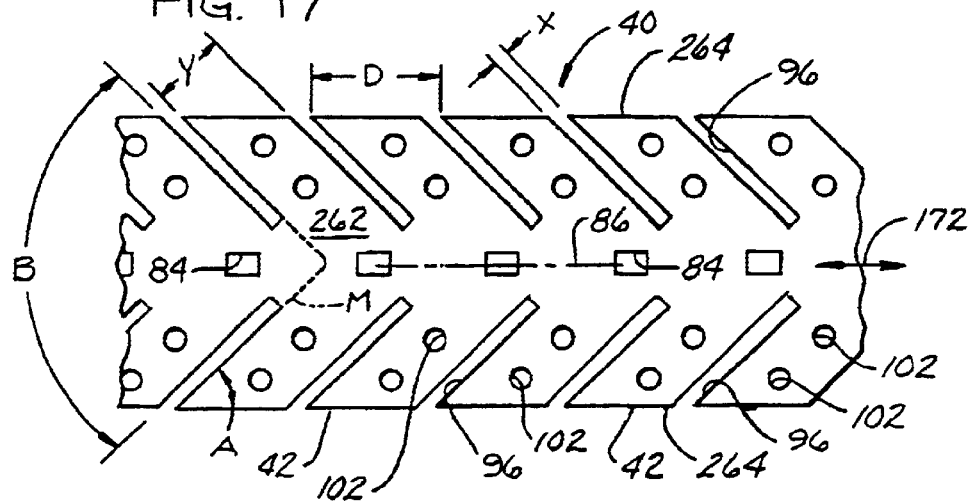
FIG. 17 is a fragmentary top plan of a patterned strip of the present invention.
Figure 18:
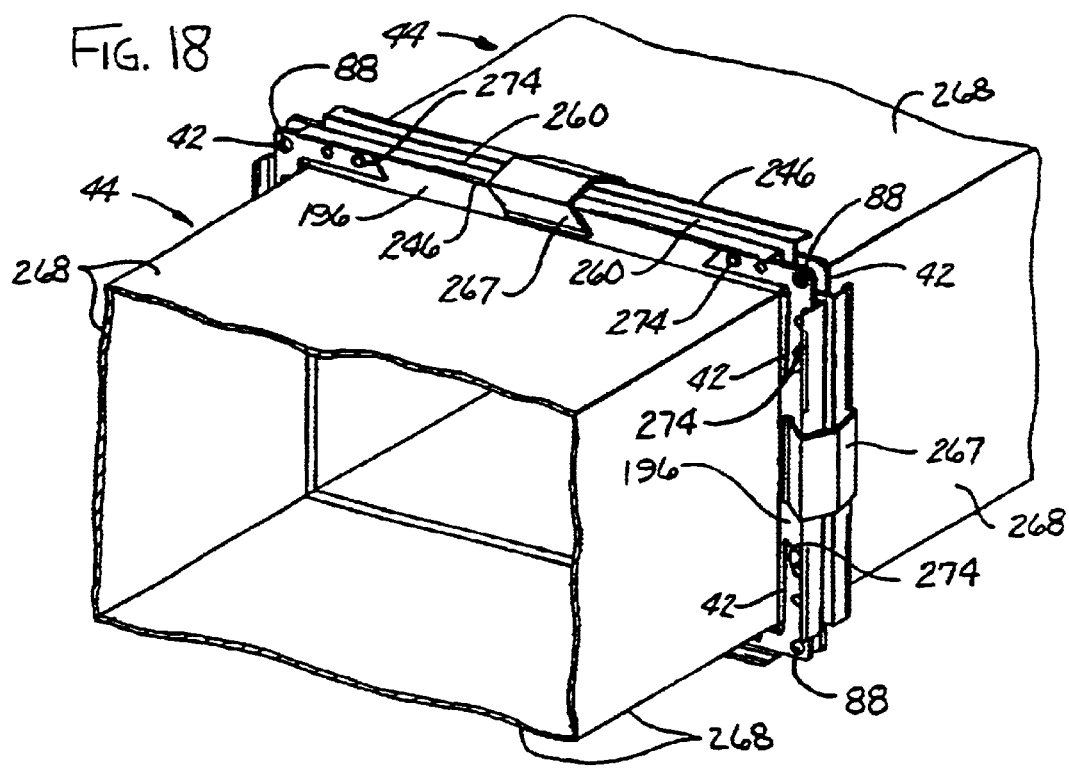
FIG. 18 is a fragmentary perspective of the duct assembly.

The patterning apparatus 70 and the fastening apparatus 72 of the lower mechanism 34a are mounted on a base 74 which is attached to the frame 32. As shown in FIG. 5, the patterning apparatus 70 includes a guide 80 for guiding the strip 40 of elements 42 in a longitudinal direction 172 (FIG. 17). The apparatus 70 has an aperture forming tool, generally designated by 82, arranged relative to the guide 80 for punching rectangular apertures 84 (FIG. 17) along a longitudinal centerline 86 of the strip 40 (FIG. 17). The apertures 84 accept fasteners 88 to connect sections of duct 44 in end-to-end relation (FIG. 18). The aperture tool 82 includes a punch 90 and a die 92 as shown in FIG. 5. In addition, the apparatus 70 has a slotting tool, generally designated by 94, arranged relative to the guide 80 for making laterally spaced pairs of elongate slots 96 in the strip 40 (FIG. 17). These slots 96 define the elements 42 within the strip 40 (FIG. 17). The tool 94 punches the slots 96 so the elements 42 remain attached to the strip 40. The slot forming tool 94 includes a pair of elongate punches 98 which engage the die 92 as shown in FIG. 5. The patterning apparatus 70 also includes a hole forming tool 100 arranged relative to the guide 80 for making holes 102 between adjacent slots 96 for facilitating connection of the strip 40 (FIG. 17) to the flanges 196 of the section of duct 44. The hole forming tool 100 includes four punches 104 which engage the die 92 as shown in FIG. 6.

As illustrated in FIG. 5, the punches 90, 98, 104 extend downward from a common carriage plate 108 which is slidably mounted on vertical posts 110 extending upward from the base 74 to a mounting plate 112. The punches 90, 98, 104 are held by respective mounting blocks 113 attached to the carriage plate 108. A conventional hydraulic actuator 114 connected between the mounting plate 112 and the carriage plate 108 moves the carriage plate to engage the punches 90, 98, 104 with the die 92 in response from a signal from the control 48a. Further, a drift 116 (FIG. 6) extends downward from the carriage plate 108 for engaging one of the previously made apertures 84 in the patterned strip 40 to ensure proper spacing of the apertures 84, slots 96 and holes 102 being made in the strip by the punches 90, 98 and 104, respectively.

Figure 7:
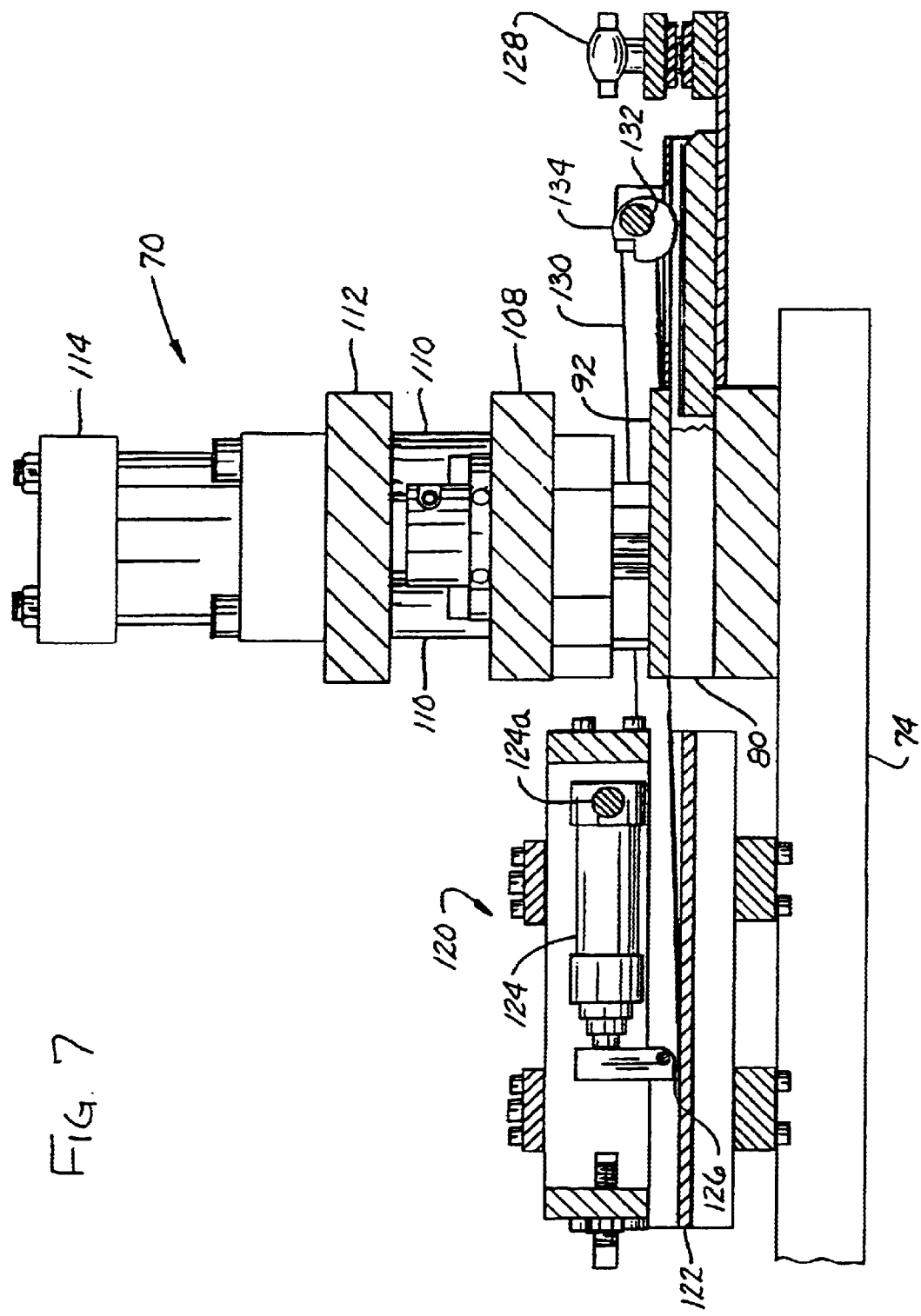
FIG. 7 is a fragmentary section of the apparatus taken in the plane of line 7—7 of FIG. 3.

As illustrated in FIG. 7, the patterning apparatus 70 also includes an indexing device, generally designated by 120, for indexing the strip S a predetermined longitudinal distance D (FIG. 17) before making subsequent apertures 84, slots 96 and holes 102 in the patterned strip 40. The indexing device 120 also simultaneously moves the patterned strip 40 into the fastening apparatus 72. Because the indexing device 120 moves the strip 40 a predetermined distance D, the patterning apparatus 70 makes evenly spaced apertures 84, slots 96 and holes 102 along the strip. The indexing device 120 includes a platform 122 mounted on the base 74 and a hydraulic actuator 124 which is pivotally mounted by a pin 124a on the base so it moves generally parallel to the platform 122 in response to a signal from the control 48a. A tooth 126 at the end of the actuator 124 engages one of the apertures 84 in the strip 40 as the actuator extends to move the strip the predetermined longitudinal distance D forward (to the left as shown). The tooth 126 disengages the aperture 84 in the strip 40 as the actuator 124 retracts. The actuator 124 pivots upward and the tooth 126 slides over the upper surface of the strip 40 as the actuator retracts so the strip remains in position. A conventional adjustable drag brake 128 engages the strip 40 to ensure that the strip remains in position when the actuator 124 retracts.

In addition, two arms 130 (only one is shown in FIG. 7) extend rearward from the actuator 124 on opposite sides of the platform 122. As illustrated in FIG. 3, a shaft 132 is connected to the rearward ends of the arms 130. Toothed cams 134 mounted on the shaft 132 engage the strip 40 to initially advance the strip through the patterning apparatus 70 when the actuator 124 extends. Once the tooth 126 engages the first aperture 84 in the strip 40, the cams 134 may be manually pivoted on the shaft 132 so they do not engage the strip. Thus, the cams 134 may be used to start a new strip 40, but may be disengaged to prevent wear once the primary indexing device 120 engages the first aperture 84. In order to make an internal portion 212 of the first element, a manual trim of the strip 40 must be made along line M, as indicated in FIG. 17. Thereafter, the internal portion 212 is automatically made as will be described hereinafter.

Figure 8:
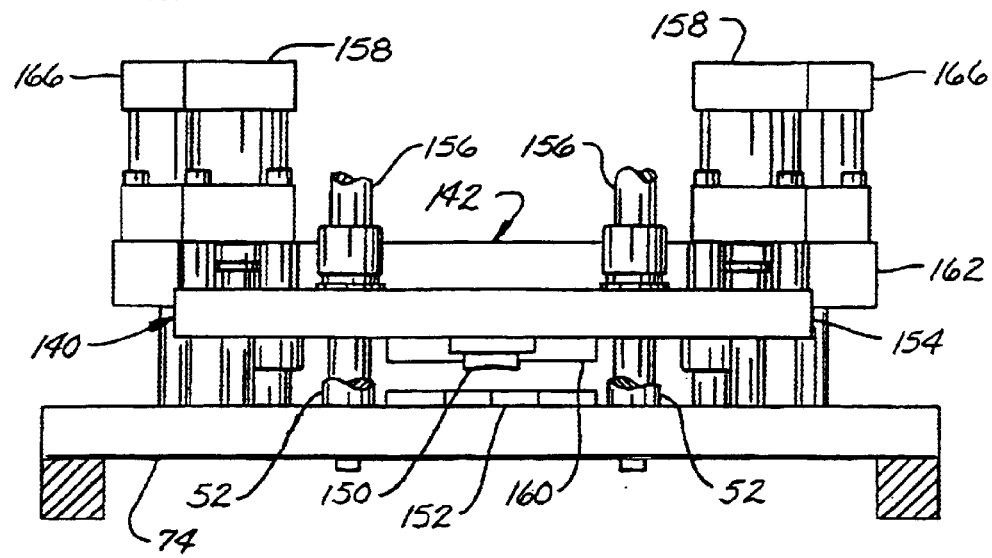
FIG. 8 is a section of the apparatus taken in the plane of line 8—8 of FIG. 4 with parts removed for clarity.

The fastening apparatus 72 generally comprises a shear (generally designated by 140), a fixture (generally designated by 142), a piercing unit (generally designated by 144) and a flaring tool (generally designated by 146) as shown in FIG. 4. As further illustrated in FIG. 8, the shear 140 includes a slot punch 150 and die 152 which are arranged relative to the fixture 142 for separating one of the elements 42 from the strip 40 after the piercing unit 144 and flaring tool 146 attach the strip to the flanges of the section of duct 44 as will be explained in further detail below. The slot punch 150 extends downward from a carriage plate 154 which is slidably mounted on two of the posts 52 extending between the upper and lower mechanisms 34a, 34b and two additional posts 156 (FIG. 13) extending upward from the base 74. A pair of conventional hydraulic actuators 158 connected between the carriage plate 154 and the base 74 move the carriage plate to drive the slot punch 150 past the die 152 in response to a signal from the control 48a.

Figure 9:
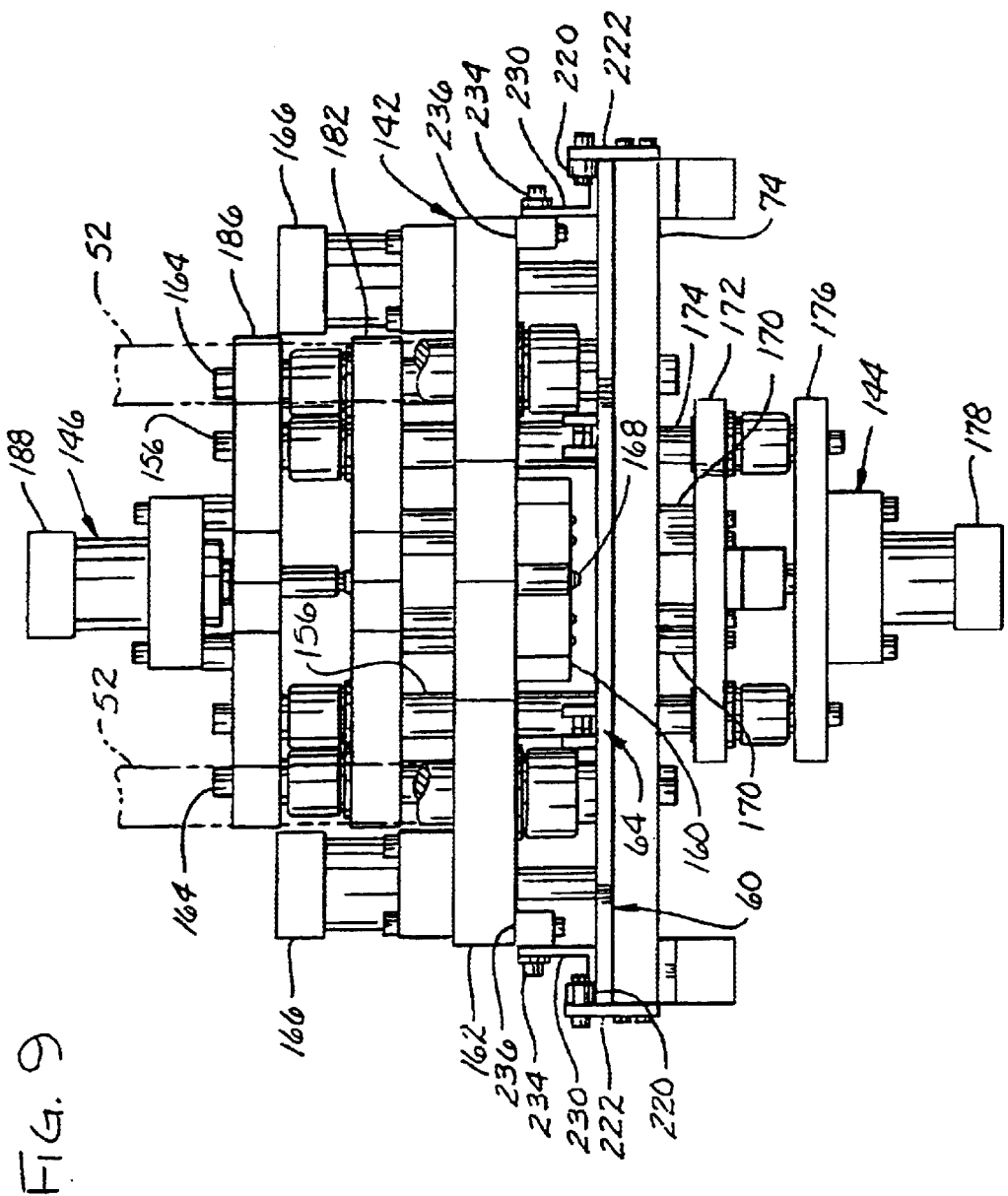
FIG. 9 is an end view of FIG. 4 seen from the vantage indicated by line 9—9 of FIG. 4.

As shown in FIG. 9, the fixture 142 includes a positioning block 160 for locating flanges of a section of duct 44 relative to the strip 40 of elements 42. The positioning block 160 extends downward from a carriage plate 162 which is slidably mounted on two of the posts 52 (FIG. 2) extending between the upper and lower mechanisms 34a, 34b and two additional posts 164 (FIG. 13) extending upward from the base 74. A pair of conventional hydraulic actuators 166 connected between the carriage plate 162 and the base 74 move the carriage plate and positioning block 160 up and down on the posts 52, 164. When in an upper most position as shown in FIG. 2, the positioning block 160 is spaced from the die 152 to permit the duct section 44 to be loaded and unloaded from the apparatus 30. When in a lowered position (not shown), the positioning block 160 holds the forward most element 42 and the flange 196 of the duct section 44 against the die 152. A pilot 168 (FIG. 9) mounted on a lower face of the positioning block 160 is provided to engage a leading aperture 84 in the strip 40 of elements 42 to ensure the leading element is properly positioned with respect to flanges of the section of duct 44.

FIG. 10 illustrates the piercing unit 144 and the flaring tool 146. The piercing unit 144 includes four piercing tools 170 mounted on a carriage plate 172 which is slidably mounted on four vertical posts 174 (only two are shown) extending downward from the base 74 to a mounting plate 176. A conventional hydraulic actuator 178 connected between the mounting plate 176 and the carriage plate 172 moves the carriage plate in response to a signal from the control 48a to push the piercing tools 170 through the flange 196 of the duct section 44 as will be explained in further detail below. The flaring tool 146 includes four swaging tools 180 mounted on a carriage plate 182 which is slidably mounted on the posts 156, 164 extending upward from the base 74 to a mounting plate 186. A conventional hydraulic actuator 188 connected between the mounting plate 186 and the carriage plate 182 moves the carriage plate in response from a signal from the control 48a to push the swaging tool 180 against the duct section flange 196 after it is pierced.

As illustrated in FIG. 11, when the piercing tools 170 move upward, they travel through openings 190 in the base 74 and openings 192 in the die 152. Each piercing tool 170 has a conical tip 194 which pierces a flange 196 of the duct section 44 and pushes a portion 198 of the duct flange 196 through a corresponding hole 102 in the patterned strip 40 of connector elements 42. A conical collar 200 is provided on the piercing tool 170 adjacent the tip 194 for deforming the flange 196 and strip 40 upward into a hole 202 in the positioning block 160. Thus, respective areas 204, 206 of the duct flanges 196 and the element 42 adjacent the hole 202 may be upset in a direction parallel to the pierced portion of the duct flange. In practice it has been found that only the area 204 of the duct flanges may be upset by the piercing action of the tool 170. Then the piercing tools 170 and swaging tools 180 simultaneously move downward to the position shown in FIG. 12. As this movement occurs, the swaging tools 180 flare the portion 198 of the flanges 196 pushed upward through the hole 102 in the strip 40 outward and downward against the strip to fasten the flanges of the section of duct and the strip to each other. The swaging tools 180 also at least partially flatten the upset areas 204, 206 of the section of flange 196 and the strip 40 (or at least of area 204 of the flange) at leading element 42 to tighten the connection between the duct and the strip. The flange material fits tightly against the element material thereby achieving an integral affixation of the strip 40 at the leading element 42 to the flange permitting no relative movement between the element and flange. The piercing unit 144 and the flaring tool 146 form a fastening tool for affixing the strip 40 to adjacent duct flanges 196 thereby preventing movement between the flanges 196 of the duct section 44 after the element 42 is separated from the duct.

Figure 22A:
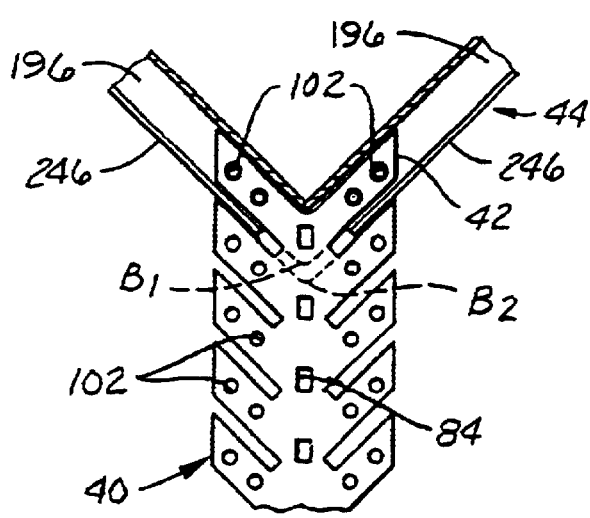
FIGS. 22A and 22B schematically illustrate attachment of a patterned strip to a duct flange and separation of an element from the strip.
Figure 22B:
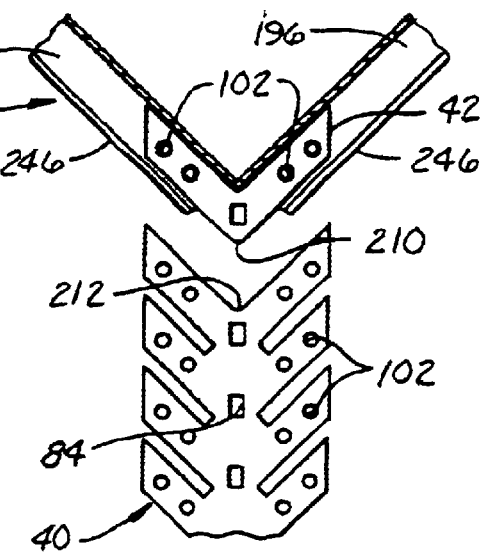

The previously described shear 140 separates the leading element 42 from the patterned strip 40 after the strip is connected to the duct. As will be appreciated by those skilled in the art, the slot punch 150 and die 152 of the shear 140 are shaped (only the angled shape of the die is visible in FIG. 13) for making an external portion 210 (FIG. 18A) on the separated element 42 and the internal portion 212 on the end of the strip 40 which will become the next separated element. Thus, the shear 140 shapes the next element 42 on the strip 40 to be received in adjacent flanges of a duct section. Operation of the slot punch 150 and die 152 on the strip 40 is schematically shown in FIGS. 22A and 22B. In FIG. 22A, the strip 40 is attached to the flanges 196 of the duct section. Break lines B1 and B2 indicate where the slot punch and die will break the strip 40 to separate the lead element. FIG. 22B illustrates removal of the duct section 44 and attached element 42 from the strip 40. It may be seen that the slot punch 150 and die 152 form the smooth external portion 210 of the leading element 42 attached to the flanges 196, and also the smooth internal portion 212 on the immediately following element.

A plate 214 is pivotally mounted on the base 74 adjacent the die 152 for guiding the advancing strip 40 of connector elements 42. The plate 214 is angled upward from the base toward the die 152, and supported in this position by springs (not shown) mounted between the plate and the base 74. Thus, patterned strip 40 moving along the plate 214 moves upward so that the leading element is located above the die 152. When the duct section 44 is moved into the apparatus 72, a rim 246 of the flange 196 (FIG. 14) passes under the awaiting leading element 42 of the strip 40. The leading element 42 and the plate 214 are moved down when the leading element is held by the positioning block 160. The rim 246 of the duct flange 196 is received in the slot 96, as is shown in FIG. 22A. The plate 214 is pivoted down against the bias of the springs and automatically pops up when the positioning block 160 is retracted for elevating the next leading element 42.

Figure 13:
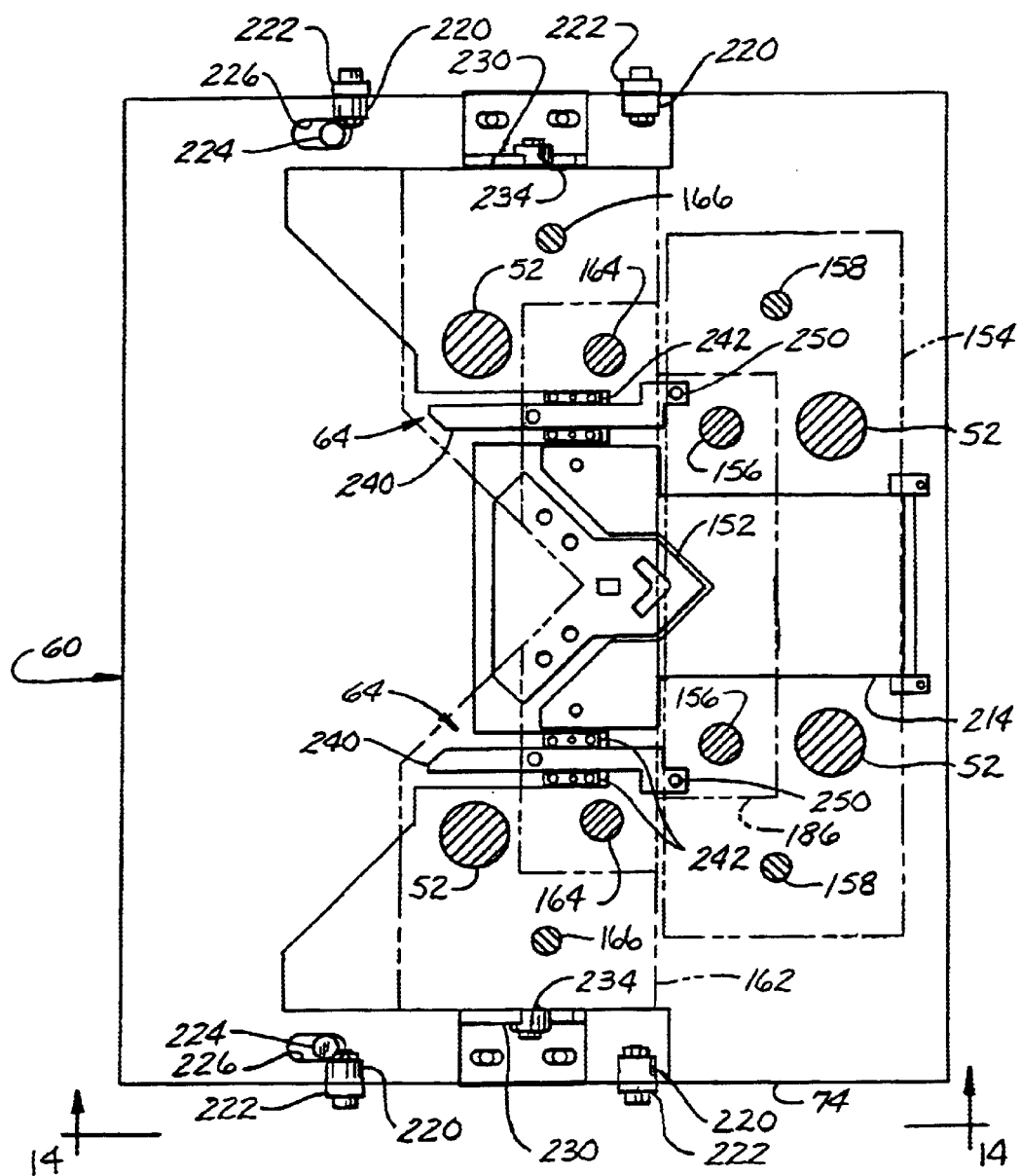
FIG. 13 is a fragmentary section of the apparatus taken in the plane of line 13—13 of FIG. 4.

As illustrated in FIG. 13, the support 60 for supporting the duct section 44 (FIG. 18) is slidably mounted on the base 74. Four roller bearings 220 mounted on adjustable mount plates 222 extending upward from the base 74 engage an upper surface of the support 60 for holding the support against the base. Two mounting bolts 224 associated with the base 74 extend upward from the frame through slots 226 on laterally opposite sides of the support 60 provided for clearance. As illustrated in FIG. 14, angle brackets 230 extend upward from each side of the support 60. The brackets 230 have cam slots 232 which receive followers 234 mounted on spacers 236 attached to each side of the positioning block carriage plate 162 so the support 60 is driven forward into the fastening apparatus 72 when the positioning block 160 is lowered and rearward when the positioning block is raised.

Figure 18A:
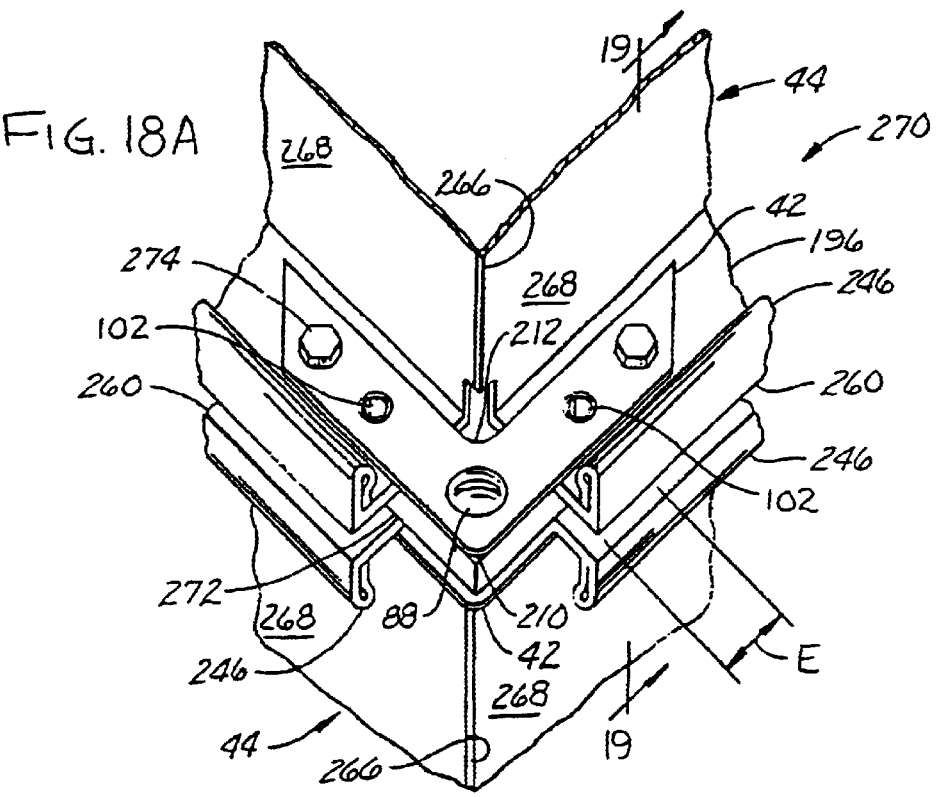
FIG. 18A is a further fragmentary perspective of a duct assembly of the present invention.

The gripping mechanisms 64 are mounted on the support 60 generally below the fixture 142. Each mechanism 64 generally includes a finger 240 pivotally mounted on the upper surface of the support 60 by mounting blocks 242. Each finger 240 is biased downward as shown in FIG. 14 by a spring 244 mounted between the positioning block carriage plate 162 and the respective finger. When a duct section 44 is loaded onto the support 60, the operator pushes the section rearward until a rim 246 formed on the flange 196 of the duct section slides under the fingers 240 and is received by slots 248 on the lower side of the fingers. Although the duct section 44 is not clamped in place by the fingers 240 because the fingers can be lifted against the biasing force of the springs 244, the fingers act to hold the duct section in place on the support 60. When the fixture 142 is actuated so the carriage plate 162 (including positioning block 160) is lowered, the followers 234 and cam slots 232 pull the support 60 forward to a position shown in FIG. 15. Thus, the duct section 44 moves into a stationary element 42 (with a corner 266 of the duct section positioned opposite the internal portion 212 of the element) which was previously put into position by operation of indexing device 120. The movement of the support 60 and duct section 44 thereon is just ahead of the positioning block 160 pushing the leading element 42 of the strip 40 into engagement with the flanges 196 adjacent the corner 266 (FIG. 18A). The element 42 is disposed on each flange 196 in a position spaced from and out of engagement with both an adjacent side 268 of the duct section 44 and an adjacent rim 246 of the flange. As clearly shown in FIG. 18A, the internal portion 212 of the element 42 is also spaced from and out of engagement with the corner 266 of the duct section 44 when the element 42 is placed into engagement with the duct flanges 196 and thereafter attached thereto as explained. After the connector element 42 is attached to the flange 196 of the duct section 44, the fingers 240 are raised as shown in FIG. 16 by the shear carriage plate 154 as it engages set screws 250 fastened to upper sides of the fingers 240 opposite the slots 248. The bracket 230, spacer 236 and follower 234 have been omitted in FIG. 16 to better show the finger 240. The set screws 250 permit adjustment of the height to which each finger 240 is raised.

Although the controls 48a, 48b may operate in other sequences without departing from the scope of the present invention, in the most preferred embodiment the controls operate to first extend the indexing device hydraulic actuator 124 and then hold the patterned strip 40 in place by actuating the fixture hydraulic actuators 166 before retracting the indexing device hydraulic actuator. While the strip 40 is held in place, the piercing unit 144 is actuated to drive the piercing tool 170 upward through the duct flange 196 and to push portions of the duct section 44 (i.e., fastening means) through the holes 102 in the strip. The flaring tool 146 is actuated to bend the protruding flange outward around the holes 102 of the leading connector element 42 as the piercing tool 170 is retracted. The strip 40 as attached to the duct flanges 196 is illustrated in FIG. 22A. Once the flaring tool 146 attaches the leading connector element 42 to the flange 196, the shear 140 is actuated to separate the leading connector element 42 from the strip 40 of connector elements. More specifically, the actuators 158 move the slot punch 150 down to punch an angled slot indicated by break lines B1 and B2 in FIG. 22A. After the leading element 42 is separated from the strip 40, the fixture hydraulic actuators 166 are extended to release the strip. Withdrawal of the duct section 44 with the separated element 42 attached to it is schematically illustrated in FIG. 22B. While the strip 40 is released, the patterning apparatus hydraulic actuator 114 is actuated to punch the aperture 84, slots 96 and holes 102 in the strip 40.

The apparatus 30 described above is used for making and attaching the patterned strip 40 to flanges 196 of duct sections 44 for facilitating connection of the sections in end-to-end relation. The apparatus 30 makes the patterned strip 40 with elements 42 and guides the strip toward a location where it is later connected to a flange 196 adjacent an end 260 (FIG. 18) of a section of duct 44. The duct is moved into the leading element 42 of the strip 40 while the element remains stationary. The fastening apparatus 72 affixes the strip 40 at the leading element 42 to the flanges 196 of the section of duct 44 and thereafter separates the attached element 42 from the strip 40.

As illustrated in FIG. 17, the patterning apparatus 70 of the present invention produces the patterned strip 40 of elements 42 for connecting sections of duct 44 (FIG. 18) in end-to-end relation. The strip 40 comprises an elongate sheet 262 having opposite lateral sides 264 extending between opposite ends (not shown) spaced along the longitudinal centerline 86 of the sheet. Further, the sheet 262 has evenly spaced slots 96 extending inward from each of the opposite lateral sides 264 of the sheet toward the longitudinal centerline 86. Each of the slots 96 extends at an angle A with respect to the side of the sheet from which it extends. Although other angles may be used without departing from the scope of the present invention, in the most preferred embodiment the angle A is about 45 degrees. Each of the slots 96 is laterally spaced from another slot so they extend inward from the opposite sides 264 of the sheet 262. Each slot 96 is oriented at an angle B of approximately 90 degrees with respect to the corresponding laterally spaced slot to accommodate corners 266 (FIG. 18A) of rectangular duct sections 44. Again, angles other than 90° could be used without departing from the scope of the present invention. The strip 262 also has a series of evenly spaced apertures 84 positioned along the longitudinal centerline 86 of the strip for accepting fasteners 88 (FIG. 18) to clamp the sections of duct 44 in end-to-end relation and holes 102 positioned between longitudinally adjacent slots 96 for facilitating connection of the strip to flanges of 196 a section of duct 44.

Figure 19:
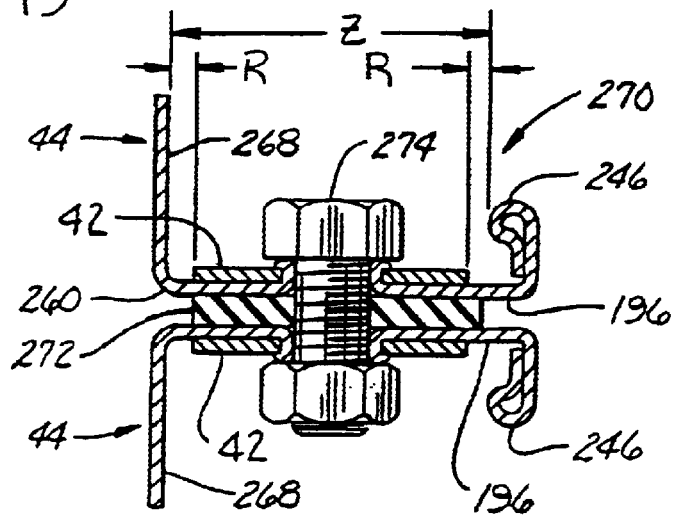
FIG. 19 is a cross section of the duct assembly shown in FIG. 18A taken in a plane including line 19—19.

FIGS. 18, 18A and 19 show a duct assembly, generally designated by 270, for transporting pressurized fluid assembled using the separated connectors elements 42 described above. The sections of duct 44 are positioned in end-to-end relation as shown so the flanges 196 extending outward from their respective ends 260 face each other thereby defining aligned flange pairs and so the corners 266 and sides 268 of the duct sections are aligned. Preferably, a conventional gasket or seal 272 is positioned between the aligned flanges 196 of the duct sections 44. The duct assembly 270 also has a flange connector pair positioned at each of the aligned corners 266 of the duct sections 44. Each connector pair comprises a pair of separated elements 42 spanning adjacent flanges 196 of each duct section 44. The pair of elements 42 are positioned on opposing faces of each flange pair 196 so the flange pair is positioned between the elements. In addition, the duct assembly 270 includes carriage bolt fasteners 88 extending through each element 42 of the element pair adjacent the corners 266 of the duct sections 44. Additional fasteners 274 may be provided through each element 42 of the pair and flange pair 196 to securely fasten the flanges together. In the illustrated embodiment (see FIG. 19), the fastener 274 takes the form of a nut and bolt fastener. Other suitable fastening devices may be used, such as sheet metal screws or machine screws (not shown). It is believed that screws of this type will provide additional strength to the joint over nut and bolt fasteners, and are also capable of being installed more rapidly. As will be understood by those skilled in the art, the fasteners 274 connecting the paired elements 42 and the flange pairs 196 not only connect the aligned connector pairs but also directly connect adjacent flanges of each duct section 44 to each other to significantly strengthen the assembly. However, it is specifically contemplated that fasteners 274 passing through the flanges 196 could be entirely omitted. In that case, the duct sections 44 would be clamped together by the carriage bolt 88. The superior strength of the connection of the separated element 42 to the duct flanges made by the piercing unit 144 and flaring tool 146 is believed to be sufficient for many applications.

The holes 102 provided in the flanges 196 and flange connectors 42 are spaced from the corner 266 by a predetermined distance E to provide leverage to prevent the flanges from separating. Although the holes may be spaced from the respective corner 266 by other distances without departing from the scope of the present invention, the holes 102 of the preferred embodiment are spaced from the respective corner 266 by a distance E of between about one half inch and about five inches. In the preferred embodiment, the holes are spaced at one and one quarter inches and two and one quarter inches from the edge of the flange at the corner 266. In addition, conventional flange clips 267 (FIG. 18) may be connected to the flange pairs 196 to prevent separation of the flange pair between the elements 42.

As illustrated in FIG. 17, the predetermined distance D and the slot width X determine the width Y of the individual elements 42. Although the elements 42 may have other widths Y without departing from the scope of the present invention, the elements of the preferred embodiment are narrower than a minimum distance Z (FIG. 19) between a side 268 of the duct section 44 and the rim 246 of the flange 196 so the elements easily fall into the channel formed by the side and rim. Thus as installed on the flanges 196, the separated element 42 engages neither the side 268 nor the rim 246 of the duct section 44 but is spaced away from each by distances R. The distance R indicated in FIG. 19 may or may not be the same between the element 42 and the side 268 as between the element and the rim 246.

Figure 20:
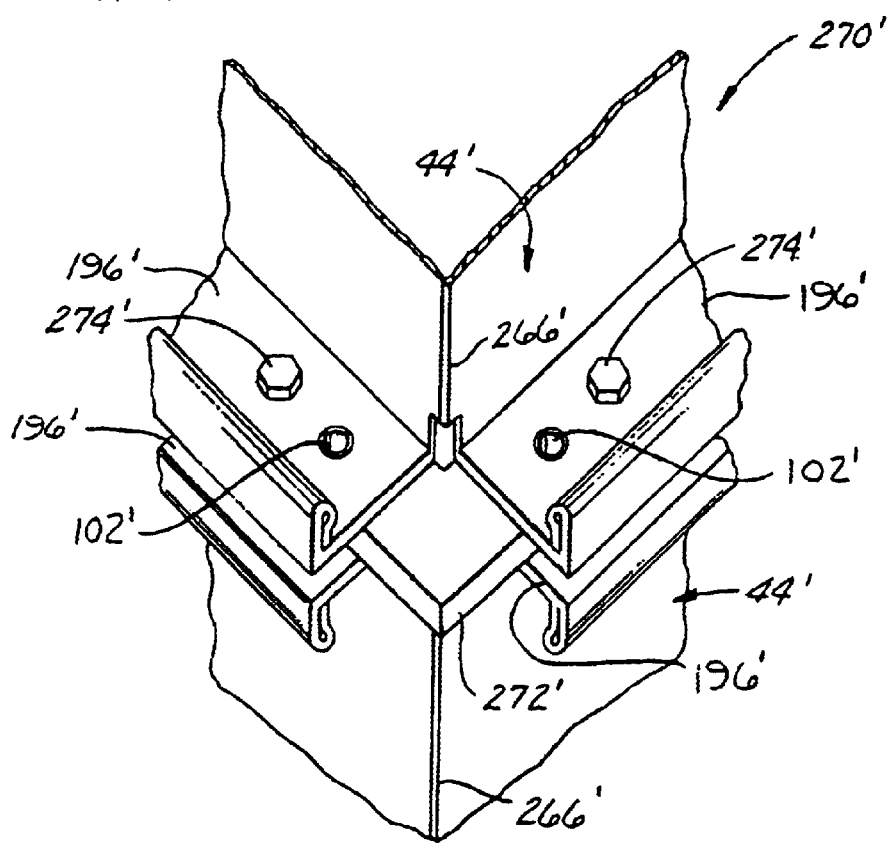
FIG. 20 is a fragmentary perspective like FIG. 18A, but of a duct assembly of a second embodiment without connector elements.
Figure 21:
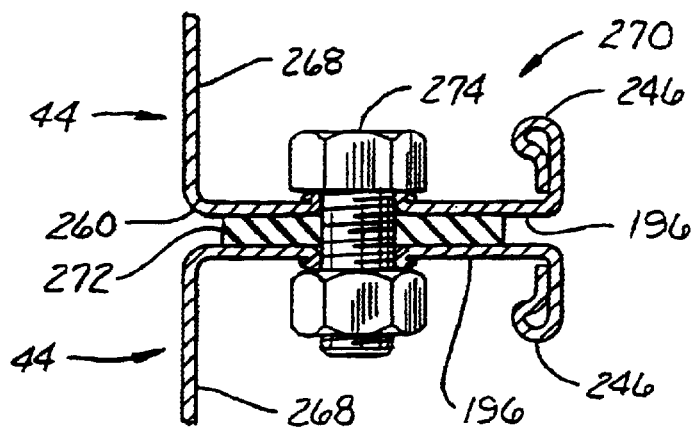
FIG. 21 is a cross section of the duct assembly of FIG. 20 taken in the plane including line 21—21.

A duct assembly 270' of a second embodiment is shown in FIG. 20 to be configured substantially the same as the duct assembly 270 of FIG. 18. Parts of the duct assembly 270' corresponding to parts of the duct assembly 270 will be indicated by the same reference numeral followed by a prime. In the second embodiment, no connector elements 42 are employed. The flanges 196' of the duct sections 44' are pierced (or otherwise formed) with holes 102' which are aligned with each other in each flange pair. A suitable fastener such as a nut and bolt fastener 274' is inserted through aligned holes 102' of the duct section flanges 196' to secure them together. Preferably there are at least two fasteners 274' passing through the adjacent flanges at each corner 266', but the use of four fasteners (one for each hole 102') provides additional strength. It is to be understood that the precise number of holes and fasteners can be other than described without departing from the scope of the present invention.

Figure 23:
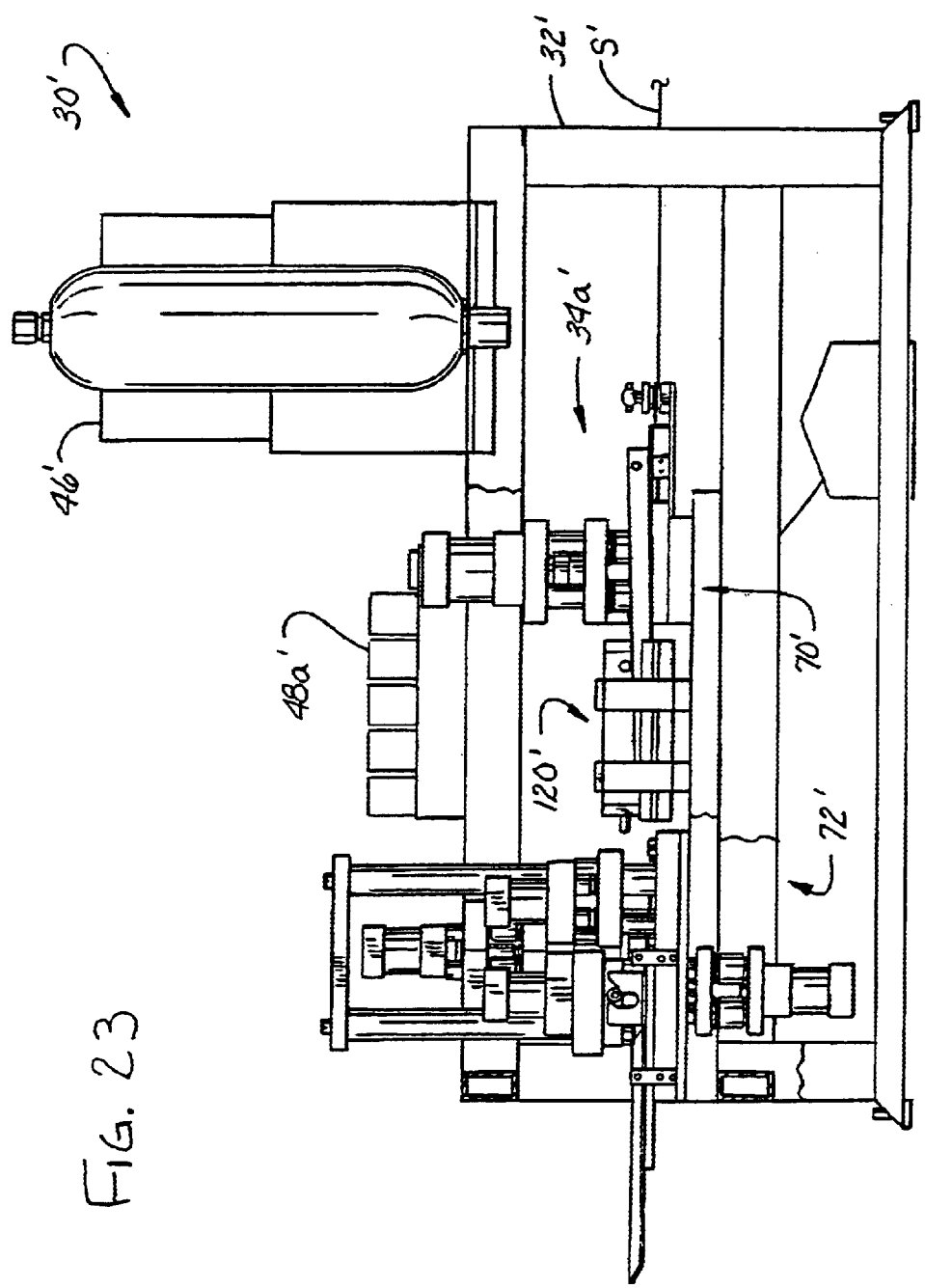
FIG. 23 is a side elevation of a second embodiment of the apparatus of the present invention for preparing duct sections for assembly.

FIG. 23 illustrates a second embodiment of the apparatus 30' of the present invention. The parts of the apparatus 30' of the second embodiment are substantially the same as the first embodiment and are designated by the same reference numerals as those of the first embodiment with the addition of a prime following the numeral. This embodiment is similar to the apparatus 30 described above except that the upper mechanism 34b and associated features have been omitted. As will be appreciated by those skilled in the art, this embodiment permits patterned strip 40 to be made and connected to one end 260 of adjacent flanges 196 of a section of duct 44. In addition to being less expensive to manufacture, this embodiment permits elements 42 of the strip to be attached to duct sections 44 of any length.

Figure 24:
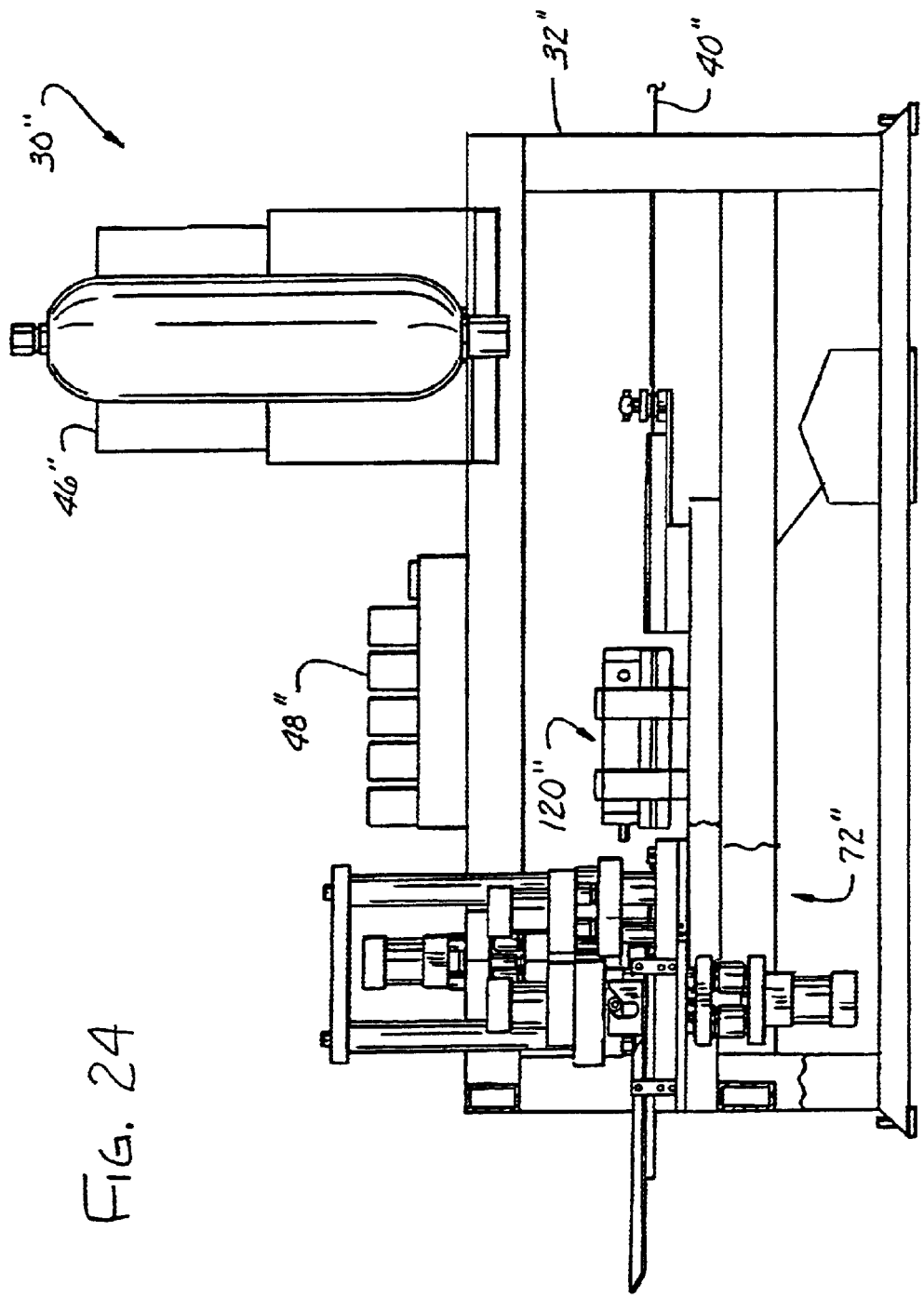
FIG. 24 is a side elevation of a third embodiment of the apparatus of the present invention for preparing duct sections for assembly.

FIG. 24 illustrates a third embodiment of the apparatus 30" of the present invention. The parts of the apparatus 30" of the third embodiment are substantially the same as the first embodiment and are designated by the same reference numerals as those of the first embodiment with the addition of a double prime following the numeral. This embodiment is closely similar to the apparatus 30' of the second embodiment except the patterning apparatus 70" has been omitted. This embodiment may be used with strips 40 of elements 42 which are pre-formed and shipped in coils to the site where the strip will be attached to the duct section flanges.

Figure 25:
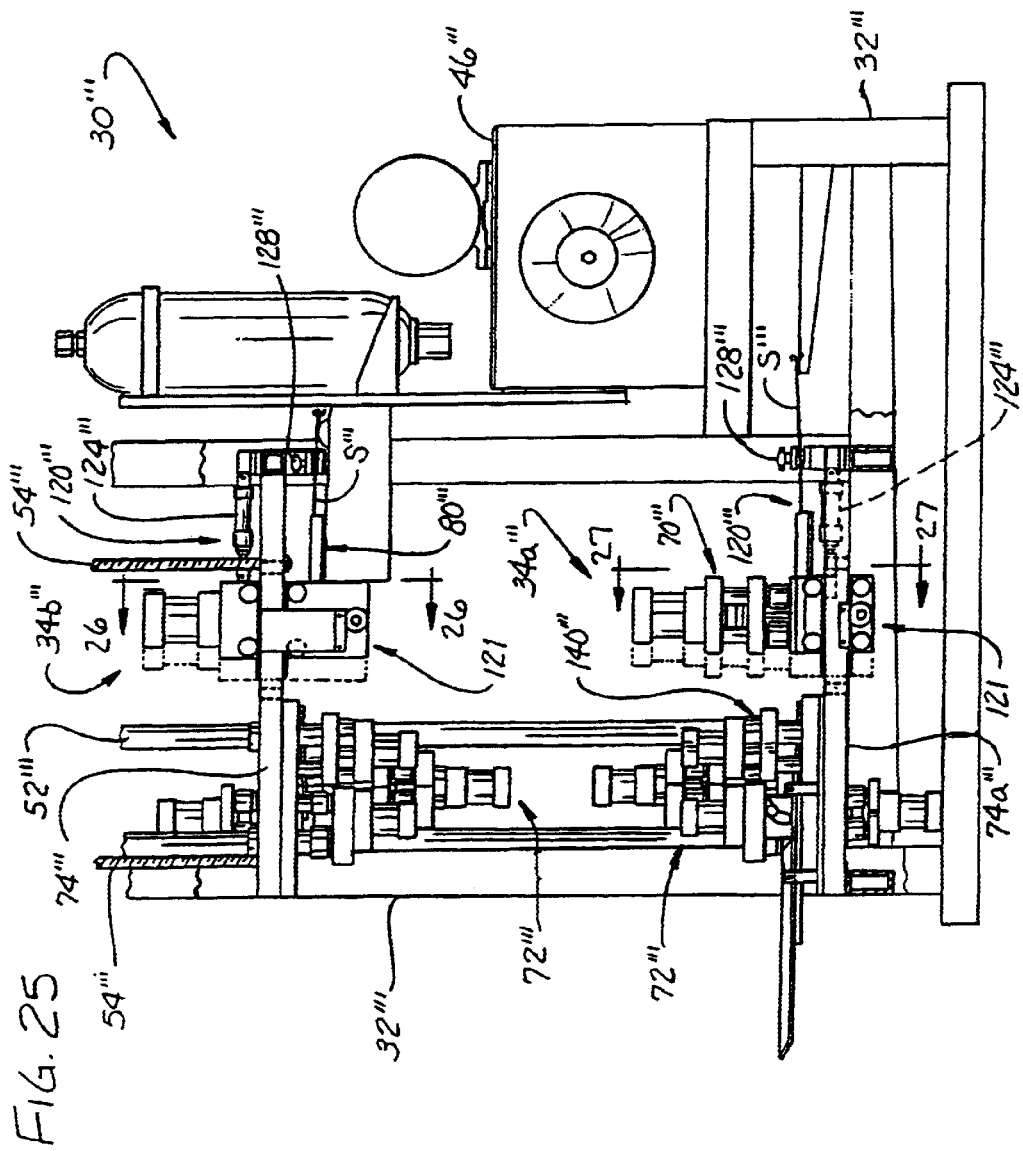
FIG. 25 is a fragmentary side elevation of a fourth embodiment of the apparatus for preparing duct sections for assembly.

Referring now to FIGS. 25–27, an apparatus 30'" of a fourth embodiment is shown. Corresponding parts of the apparatus 30'" will be designated by the same reference numerals as the apparatus 30 of the first embodiment, followed by a triple prime. The apparatus 30'" is substantially the same as the apparatus 30 shown in FIG. 1 except that the strip patterning apparatus 70 and the indexing device 120 of the first embodiment have been constructed with an integration of function which allows for a more compact configuration of the apparatus 30'". As will be explained more fully below, the strip patterning apparatus 70'" replaces the tooth 126 of the first embodiment in gripping the steel strip S'" to move it forward. The other parts of the apparatus 30'" which remain unchanged will not be further described. It is noted that the rear vertical components of the frame 32'" have been moved forward such that the hydraulic supply 46'" are located and supported by the frame to the rear of the rear vertical component in the fourth embodiment. However, these changes have no affect on the operation of the hydraulic supply 46'". A double coil holder like the coil holder 50 is used but has not been illustrated in the fourth embodiment.

The construction of the strip patterning apparatus 70'" is substantially unchanged from the strip patterning apparatus 70 of the first embodiment. However, instead of being fixedly mounted on the base 74'", the strip patterning apparatus 70'" is mounted by the indexing device 120'" for forward and backward movement on the rails forming the base. Referring first to FIG. 27 illustrating the lower mechanism 34a'", the indexing device 120'" of the fourth embodiment comprises a carriage, generally indicated by 121, including a platform 121a and depending side plates 121b fixedly attached to opposite lateral sides of the platform. Two pairs of generally opposed upper and lower rollers 121c are mounted for rotation on each side plate 121b. The rollers 121c in each pair are located on opposite sides of a respective one of the rails 74a'", mounting the carriage 121 for rolling movement forward (toward the fastening apparatus 72'") and backward. A cylinder 124'" of the indexing device 120'" mounted at its barrel end on the frame 32'" is attached by a block 124a'" to the platform 121a of the carriage 121 for moving the carriage forward and backward. The extreme backward and forward positions of the strip patterning apparatus 70'" are illustrated in solid and phantom lines, respectively, in FIG. 25. Hardened wear strips 121d mounted on the upper and lower surfaces of the rails 74a'" engage the rollers 121c and protect the rails from wear. The carriage 121 further includes a guide bar 121e extending between and through the side plates 121b. Pinions 121f rotatably mounted on the ends of the guide bar are enmeshed with respective racks 121g mounted on the rails 74a'". The guide bar 121e, pinions 121f and racks 121g hold the strip patterning apparatus 70'" in alignment as it moves. The adjustable drag brake 128'" is of the same construction as brake 128 of the first embodiment, but is mounted on the frame 32 so that it does not move with the strip patterning apparatus 70'".

The indexing device 120'" of the upper mechanism 34b'" has all of the components described above which are part of the indexing device of the lower mechanism 34a'". However in order to fit the indexing device 120'" and strip patterning apparatus 70'" of the upper mechanism 34b'", the side plates 121b are made longer, and the mounting plate 112'" of the strip patterning apparatus is widened and attached to the side plates, as is shown in FIG. 26. In order for the pinions 121f of the guide bar 121e to engage the racks 121g in the upper mechanism 34b'", the racks are mounted to the rails 74a'" by extenders 121h hanging down from the side rails. The drag brake 128'" of the upper mechanism 34b'" is mounted on the frame in a location below the cylinder 124'", rather than above as with the lower mechanism 34a'".

The operation of the apparatus 30'" of the fourth embodiment is substantially the same as the apparatus 30 of the first embodiment, except that initial feeding of the strip S'" is simplified and the apparatus 30'" can be more compact. For purposes of the description, reference is made to the strip patterning apparatus 70'" and indexing device 120'" of the lower mechanism 34a'", the operation of the upper mechanism 34b'" being the same. The strip S'" is hand fed through the drag brake 128'" and into the strip patterning apparatus 70'". The strip patterning apparatus is activated to punch the strip S'", but the punches are not released and remain extending through the strip. The cylinder 124'" is extended to move the carriage 121, strip patterning apparatus 70'" and strip S'" forward (to the position shown in phantom in FIG. 25). The strip patterning apparatus 70'" is released and the cylinder 124'" retracts to move the carriage 121 backward. The drag brake 128'" holds the strip S'" (including patterned strip 40 not illustrated in FIGS. 25–27) from moving backward with the carriage 121 and strip patterning apparatus 70'". Although the apparatus 30'" is not fully fed, it is no longer necessary to handle the strip S'" after the first stroke of the patterning apparatus 70'". The punch, extend, release and retract cycle is repeated until the formed strip 40 is fed through the fastening apparatus 72'".

Once the strip 40 is fed to the fastening apparatus, the cycle of operation is generally as follows. The strip patterning apparatus 70'" moves down to punch the strip S'" and define an element 42 of a pattern (not shown in FIGS. 25–27). The cylinder 124'" extends to move the carriage 121 and strip forward the predetermined distance D into the fastening apparatus 72'", positioning an element 42 in position to be fastened to the flanges of the section of duct. The fastening apparatus 72'" is cycled as described above, except that the shear 140'" is not activated to separate the element fastened to the duct section from the strip 40. The strip patterning apparatus 70'" releases the strip and the cylinder 124'" retracts to pull the carriage 121 and strip patterning apparatus backward. The strip patterning apparatus 70'" is reactivated to punch the strip again. Thereafter, the shear 140'" extends to separate the connected element from the strip and the duct section is released for removal from the fastening apparatus 72'". The cylinder 124'" extends as described previously. In this way the strip patterning apparatus 70'" is beneficially employed to grip the strip S'" for indexing the strip forward during operation of the apparatus 30'".

In view of the above, it will be seen that the several objects of the invention are achieved and other advantageous results attained.

The intent of this invention is to reduce cost of the duct making process and to increase the quality of the duct assembly. In order to connect ducts, the present invention does two things. First, it elects to connect flanges of the ducts, rather than any other portion. It is not specified that the flanges be integral or added. In the preferred embodiment only, the flanges are integral with the duct walls. To accomplish the action of connecting the duct flanges, the present invention does one of three things: it can either clamp connectors of the aligned ducts, clamp flanges of these aligned ducts, or clamp both the connector portions and the flanges. The action of clamping the connectors, flanges, or both is accomplished in the preferred embodiment only with fasteners, for example, carriage bolts.

In order to connect ducts, the present invention does another thing: it elects to rigidize flanges of the ducts, rather than any other portion. Again, it is not specified that the flanges be integral or added. In the preferred embodiment only, the flanges are integral with the duct walls. The action of rigidizing may affect the stiffness of a duct in two ways: with respect to the common plane of aligned duct end portions, and within that plane. If this common plane were to distort, the aligned duct end portions may separate and no longer seal. Even if this plane were undistorted, the end opening of the duct may become skewed from its normal rectangular shape. Either or both of these modes of distortion can be prevented by rigidizing the flanges of the duct ends.

To accomplish the action of rigidizing the duct flanges, the present invention does two things: it acts to add a layer of rigid material to the flange, and it acts to eliminate shear motion between this layer and the flange. The added layer of material may also bridge the gap in the flange formed by the bending of the duct sides in an integral-flange design, or it may bridge the gap left between adjacent added flanges.

The other action, eliminate shear motion, is believed to be unique to the present invention. Conventional approaches allow shearing motion between the flange and its added layer. The reason for this motion is that the corner piece is wedged between the flange outer lip and the duct wall. While this arrangement prevents significant lateral motion of the piece with respect to the flange, longitudinal slip is always possible.

The meaning of "significant" here is instructive and important. It is well known in the art that small shearing motions between layers have a large effect on the rigidity of the resulting ensemble. For example, if I support a weight with a stack of two planks, the stiffness is twice as much as with one. But if one joins those two planks by gluing them along their adjacent faces, the stiffness is eight times that of a single plank. The amount of shearing motion that the glue prevents in the two plank stack may be very small compared with the bending that is observed.

Understanding the substantial advantage that eliminate shear motion confers on the present invention, the details of exactly how it is accomplished form several alternate embodiments of the invention. To accomplish the action of eliminating shear between the duct flanges and an added layer, the present invention does one of three things: it can either fasten layers such as with an adhesive over a large portion of the aligned surfaces, fix translation of the abutting surfaces by piercing the flange in one place on each leg, or fix rotation of the abutting surfaces as well by piercing the flange in two places on each leg.

In the preferred embodiment the rotation and translation are fixed by two piercings of the flange into each leg of the added layer. The alternative single piercing is sufficient to eliminate longitudinal and lateral shear, but may not prevent rotational shear. Thus it is effective in eliminating shear but not as effective as two piercings. In the preferred embodiment, the piercing is followed by a flaring action which forms a rivet of the flange material that captures the added layer. Other alternative embodiments obtain from replacing a piercing action with spot welding or other fastening means.

Referring again to the prior art method of pressing, wedging and crimping a corner piece into a duct flange, the present invention is distinct in that there is no wedging between its added layer and the upturned walls of the flange or the duct. Indeed, no contact at all takes place between the edges of the added layer and any part of the flange or duct.

Returning to the add layer function of the present invention (in order to rigidize flanges of the ducts), three things must be done: the strip must be positioned, the layer in the form of a strip of material must be held in place for fastening, and the duct must be positioned to receive the added layer.

In the preferred embodiment, an operator can see that the strip or strips are positioned properly before presenting the duct to the machine for attachment. This control assures that there is no mistake in the machine cycle, and thus the machine becomes more predictable.

The feed strip function of the present invention exists in order to add a layer to the flange. In contrast to the prior art, the strip need not take the form of a corner piece. It need not have the shape of an "L" at any time. It does not contact or press against the walls of the flange as a corner piece does. With respect to adding a layer, the distinguishing features of the invention have already been disclosed. A preferred embodiment to accomplish the feed strip function involves the two sub-functions: advance strip and sever strip. In this case, the strip material is moved forward into position, the duct is then pulled into its corresponding position, the strip is affixed to the duct flange and a portion of the strip is severed to form the added layer.

Results of this invention provide the industry with the ability to make ducting that performs to higher standards.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. As used herein, the word "form" (as variously conjugated) is intended to include punching, cutting, drilling, molding, casting or otherwise creating the thing formed.

As various changes could be made in the above constructions without departing from the scope of the invention, it is intended that all matter contained in the above description or shown in the accompanying drawings shall be interpreted as illustrative and not in a limiting sense.

What is claimed is:

1. A method of attaching a patterned strip to a flange of a duct section for facilitating connection of duct sections in end-to-end relation, said patterned strip including a plurality of connector elements formed integral therewith, said duct flange having opposed sides, said method comprising the steps of:

guiding the patterned strip toward a location where a leading connector element of the patterned strip is to be attached to the flange at an end of the section of duct;

locating the leading connector element of the patterned strip relative the duct flange in a position spaced from and out of engagement with the opposed sides of the duct flange;

attaching the leading connector element of the patterned strip to the duct flange; and separating said attached leading connector element of the patterned strip from the patterned strip.

2. The method as set forth in claim 1 further comprising the step of making a hole in the leading connector element of the patterned strip prior to attaching the patterned strip to the duct flange, and wherein the step of attaching the leading connector element of the patterned strip to the duct flange includes the step of pushing a portion of the duct flange through the hole.

3. The method as set forth in claim 2 wherein the step of attaching the leading connector element of the patterned strip to the duct flange further includes bending the portion of the flange pushed through the hole against the leading connector element of the patterned strip surrounding the hole thereby fastening the leading connector element to the duct flange.

4. A method of attaching an element to a flange at an end of a duct section to facilitate connection of duct sections to each other in end-to-end relation, the duct section flange having opposed sides, the method comprising the steps of:

locating an element relative to the duct section flange generally at an end of said duct section;

positioning the element within the duct section flange in a position spaced from and out of engagement with the opposed sides of the duct section flange; and permanently affixing said element to said duct section flange by moving fastening means from at least one of the element and duct section flange through another of the element and the duct section flange to make an integral connection of said element to the duct section flange.

5. A method as set forth in claim 4 wherein said step of permanently affixing said element to said duct section flange comprises moving a portion of material of said duct section flange through at least part of said element.

6. A method of assembling a duct assembly comprising first and second duct sections, each section having sides extending between opposite ends, each of said sides joining an adjacent side and having a flange extending laterally outward from each end, each of said flanges having opposed side portions, said method comprising the steps of:

positioning said first and second sections in end-to-end relation so that said flanges extending outward from one of said ends of said first section, face said flanges extending outward from one of said ends of said second section thereby defining aligned flange pairs and so that the sides of said first duct section are aligned with the sides of said second duct section;

positioning a connector pair comprising first and second connectors at one of said ends of said first and second duct sections so that said first connector spans adjacent flanges of said first duct section and said second connector spans adjacent flanges of said second duct section, said first and second connectors being located on the adjacent flanges in a position spaced from the opposed side portions thereof, said first and second connectors being positioned on opposite faces of an adjacent flange pair so that said flange pair is positioned between said first and second connectors; and securely fastening said connector pair and one of said flange pairs together thereby connecting said flange pair.

7. A method as set forth in claim 6 further comprising the steps of positioning additional connector pairs adjacent other aligned flange pairs so that said additional connector pairs are positioned on opposite sides of said other aligned flange pairs in positions spaced from the opposed side portions thereof, and securely fastening said additional connector pairs to said other aligned flange pairs thereby connecting remaining adjacent flanges of said first section to the remaining adjacent flanges of said second section.

8. A method for making a patterned strip from a strip of material for use in connecting sections of duct and for attaching a leading edge portion of the patterned strip to a flange of a section of duct, said duct flange having opposed sides, said method comprising the steps of:

providing a strip of material, said strip having opposite lateral sides extending parallel to a longitudinal centerline of the strip;

guiding said strip of material in a longitudinal direction;

making a laterally spaced pair of slots in the strip, each of said slots being obliquely aligned with respect to the lateral sides of said strip;

moving the strip a predetermined longitudinal distance before making subsequent laterally spaced pairs of slots in the strip;

making at least one hole between adjacent slots for facilitating connection of the strip to a flange of a section of duct;

locating the section of duct relative to a leading edge portion of the strip in a position spaced from and out of engagement with the opposed sides of the duet flange;

affixing the duct flange and a leading edge portion of the strip to each other; and separating the leading edge portion of the strip from the strip.

9. The method as set forth in claim 8 wherein the step of affixing the duct flange and a leading edge portion of the patterned strip to each other includes pushing a portion of the duct flange through at least one of the holes made in the strip at the leading edge portion thereof.

10. The method as set forth in claim 9 wherein said step of affixing the duct flange and a leading edge portion of the patterned strip to each other further includes bending the portion of the duct flange pushed through said at least one hole against the strip to fasten the duct flange and the strip to each other.

11. The method as set forth in claim 8 further comprising the step of making apertures generally along the longitudinal centerline of the strip.

12. The method as set forth in claim 11 further comprising the step of engaging at least one of said apertures along the longitudinal centerline of the strip to locate the leading edge portion of the strip relative to the section of duct.

13. A method for making a patterned strip for use in connecting sections of duct, said patterned strip having opposite lateral sides extending parallel to a longitudinal centerline of the strip, said method comprising the steps of:

providing a strip of material;

guiding the strip in a longitudinal direction;

making a laterally spaced pair of slots in the strip, each of said slots being obliquely aligned with respect to the lateral sides of said strip;

moving the strip a predetermined longitudinal distance before making subsequent laterally spaced pairs of slots in the strip; and making at least one hole between adjacent slots for facilitating connection of the strip to the sections of duct.

14. The method as set forth in claim 13 further comprising the step of making apertures generally along the longitudinal centerline of the strip.

15. A method for making a patterned strip for use in connecting sections of duct and for attaching a leading edge portion of the patterned strip to a flange of a section of duct, said patterned strip having opposite lateral sides extending parallel to a longitudinal centerline of the strip, said method comprising the steps of:

providing a strip of material;

guiding said strip of material in a longitudinal direction;

making a laterally spaced pair of slots in the strip, each of said slots being obliquely aligned with respect to the lateral sides of said strip;

moving the strip a predetermined longitudinal distance before making subsequent laterally spaced pairs of slots in the strip;

making at least one hole between adjacent slots for facilitating connection of the strip to a flange of a section of duct;

making at least one aperture generally along the longitudinal centerline of the strip;

engaging said at least one aperture along the longitudinal centerline of the strip to locate the leading edge portion of the strip relative to the section of duct;

affixing the duct flange and a leading edge portion of the patterned strip to each other; and separating the leading edge portion of the patterned strip from the patterned strip.

* * * * *

UNITED STATES PATENT AND TRADEMARK OFFICE
CERTIFICATE OF CORRECTION

PATENT NO. : 6,810,570 B2
DATED : November 2, 2004
INVENTOR(S) : Joshua D. Fischer et al.

It is certified that error appears in the above-identified patent and that said Letters Patent is hereby corrected as shown below:

Column 18,
Line 29, delete "duet" and replace with -- duct --.

Signed and Sealed this

First Day of February, 2005

JON W. DUDAS
*Director of the United States Patent and Trademark Office*